US012278479B2

United States Patent
Watase et al.

(10) Patent No.: US 12,278,479 B2
(45) Date of Patent: Apr. 15, 2025

(54) RESTRICTED EARTH FAULT RELAY

(71) Applicant: Mitsubishi Electric Corporation, Tokyo (JP)

(72) Inventors: Reiji Watase, Tokyo (JP); Shigeto Oda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 34 days.

(21) Appl. No.: 18/258,230

(22) PCT Filed: Jan. 8, 2021

(86) PCT No.: PCT/JP2021/000456
§ 371 (c)(1),
(2) Date: Jun. 19, 2023

(87) PCT Pub. No.: WO2022/149256
PCT Pub. Date: Jul. 14, 2022

(65) Prior Publication Data
US 2024/0297496 A1  Sep. 5, 2024

(51) Int. Cl.
*H02H 7/045* (2006.01)
(52) U.S. Cl.
CPC .................... *H02H 7/045* (2013.01)
(58) Field of Classification Search
CPC .......... H02H 7/045; H02H 3/165; H02H 3/28; G01R 19/10
(Continued)

(56) References Cited

U.S. PATENT DOCUMENTS

| 2012/0140365 A1* | 6/2012 | Labuschagne | ........... H02H 3/16 361/47 |
| 2013/0120888 A1 | 5/2013 | Kase | |

FOREIGN PATENT DOCUMENTS

| JP | 2000224755 A | 8/2000 |
| JP | 2002017037 A | 1/2002 |

(Continued)

OTHER PUBLICATIONS

P. E. Sutherland, "Application of transformer ground differential protection relays," 1999 IEEE Industrial and Commercial Power Systems Technical Conference (Cat. No. 99CH36371), Sparks, NV, USA, 1999, pp. 6 pp.—, doi: 10.1109/ICPS.1999.787224 (Year: 1999).*

(Continued)

*Primary Examiner* — Thienvu V Tran
*Assistant Examiner* — Sreeya Sreevatsa
(74) *Attorney, Agent, or Firm* — BUCHANAN, INGERSOLL & ROONEY PC

(57) ABSTRACT

A restricted earth fault relay includes: a first differential amount calculation unit that calculates a first differential amount based on a zero-phase current and a neutral point current; a current change detection unit that detects changes in the phase currents; and a first suppression amount calculation unit that calculates a first suppression amount. When the changes in the phase currents are detected, the first suppression amount calculation unit calculates a first maximum value as the first suppression amount, the first maximum value being a maximum value of effective values of the subtraction currents in the phases and an effective value of the neutral point current. The restricted earth fault relay further includes an operation determination unit that outputs a protection signal for protecting a three-phase transformer, when the first differential amount and the first suppression amount are within an operating region.

11 Claims, 14 Drawing Sheets

(58) Field of Classification Search
USPC .......................................................... 361/42
See application file for complete search history.

(56) References Cited

FOREIGN PATENT DOCUMENTS

| JP | 2012016151 A |   | 1/2012 |
|----|--------------|---|--------|
| JP | 2016010223 A | * | 1/2016 |
| JP | 2019030073 A | * | 2/2019 |

OTHER PUBLICATIONS

International Search Report (PCT/ISA/210) with English translation and Written Opinion (PCT/ISA/237) mailed on Mar. 16, 2021, by the Japanese Patent Office as the International Searching Authority for International Application No. PCT/JP2021/000456.

* cited by examiner

RESTRICTED EARTH FAULT RELAY

TECHNICAL FIELD

The present disclosure relates to a restricted earth fault relay.

BACKGROUND ART

A current differential relay protects a section surrounded by a current transformer (CT) with a current input from the CT in power equipment such as a transformer, power transmission lines and the like. A restricted earth (ground) fault relay (zero-phase current differential relay), which is one type of a current differential relay, detects a ground fault in a protected section with high sensitivity by using a zero-phase current. A ground fault protection relay that uses phase currents and a neutral point current of a Y-connected winding of a transformer is, for example, known as the restricted earth fault relay.

For example, a restricted earth fault relay described in Japanese Patent Laying-Open No. 2019-030073 (PTL 1) includes: a relay computation unit that computes a differential amount and a suppression amount based on a zero-phase current based on phase currents and a neutral point current, and determines whether the differential amount and the suppression amount are within an operating region; a phase determination unit that determines whether a phase of the neutral point current with respect to the zero-phase current is within a first region including the phase; and an operation determination unit that outputs a protection signal for protecting a three-phase transformer based on a result of determination by the relay computation unit and a result of determination by the phase determination unit.

CITATION LIST

Patent Literature

PTL 1: Japanese Patent Laying-Open No. 2019-030073

SUMMARY OF INVENTION

Technical Problem

According to the restricted earth fault relay described in PTL 1, in order to detect a ground fault, it is required that a certain amount or more of the zero-phase current and the neutral point current used for phase determination should flow. When an internal ground fault occurs on the power supply side, a ground fault current flowing through a fault point is divided into a current flowing to the power supply side through the ground and a neutral point current flowing from a neutral point to a three-phase winding. In addition, the neutral point current is divided into a current flowing from a winding of a fault phase to the fault point and a current flowing from a winding of a normal phase to the power supply. Therefore, the neutral point current is smaller than the ground fault current. Particularly when a ground fault occurs near the neutral point (e.g., winding), the neutral point current becomes smaller because the ground fault current itself is small. When the neutral point current is small at the time of the occurrence of an internal ground fault on the power supply side as described above, phase determination cannot be made.

In addition, when a three-phase short-circuit external fault occurs and CT saturation occurs in any phase, the neutral point current does not flow although the zero-phase current flows. Therefore, in this case as well, phase determination cannot be made with high accuracy. Thus, in PTL 1, the restricted earth fault relay may malfunction and there is room for improvement in achieving both fault detection with high sensitivity and prevention of malfunction.

An object of an aspect of the present disclosure is to provide a restricted earth fault relay that can achieve both fault detection with high sensitivity and prevention of malfunction.

Solution to Problem

According to an embodiment, there is provided a restricted earth fault relay for protecting a three-phase transformer including a Y-connected winding. Phase currents and a neutral point current of the Y-connected winding are defined to have the same polarity in a direction toward a neutral point. The restricted earth fault relay includes: a first differential amount calculation unit that calculates a first differential amount based on a zero-phase current and the neutral point current, the zero-phase current being based on the phase currents; a current change detection unit that detects changes in the phase currents; and a first suppression amount calculation unit that calculates a first suppression amount based on a result of detection by the current change detection unit, the phase currents and the neutral point current. The first suppression amount calculation unit calculates subtraction currents for the respective phase currents, the subtraction currents being obtained by subtracting the phase currents in a cycle earlier than a current cycle from the phase currents in the current cycle. When the changes in the phase currents are detected, the first suppression amount calculation unit calculates a first maximum value or a first addition value as the first suppression amount, the first maximum value being a maximum value of effective values of the subtraction currents in the phases and an effective value of the neutral point current, the first addition value being a value obtained by adding the effective value of the neutral point current to a maximum value of the effective values of the subtraction currents in the phases. The restricted earth fault relay further includes an operation determination unit that outputs a protection signal for protecting the three-phase transformer, when the first differential amount and the first suppression amount are within an operating region.

According to another embodiment, there is provided a restricted earth fault relay for protecting a three-phase transformer including a Y-connected winding. Phase currents and a neutral point current of the Y-connected winding are defined to have the same polarity in a direction toward a neutral point. The restricted earth fault relay includes: a first differential amount calculation unit that calculates a first differential amount based on a zero-phase current and the neutral point current, the zero-phase current being based on the phase currents; a first suppression amount calculation unit that calculates a first suppression amount based on a scalar sum of the phase currents and the neutral point current; an operation determination unit that outputs a protection signal for protecting the three-phase transformer, when the first differential amount and the first suppression amount are within an operating region; and an output control unit that locks output of the protection signal by the operation determination unit. The output control unit includes: a current change detection unit that detects changes in the phase currents; a second differential amount calculation unit that calculates an absolute value of an addition current as a second differential amount, the addition current being obtained by adding the phase currents and the neutral point current; and a second suppression amount calculation unit that calculates a second suppression amount based on the phase currents and the neutral point current. The second suppression amount calculation unit calculates subtraction currents for the respective phase currents, the subtraction currents being obtained by subtracting the phase currents in a cycle earlier than a current cycle from the phase currents in the current cycle, and calculates, as a second suppression amount, a maximum value of absolute values of the subtraction currents in the phases and an absolute value of the neutral point current. The output control unit further includes a signal output unit that outputs a lock signal for locking the output of the protection signal, when the changes in the phase currents are detected and when the second differential amount and the second suppression amount are not within a second operating region.

ADVANTAGEOUS EFFECTS OF INVENTION

The restricted earth fault relay according to the present disclosure can achieve both fault detection with high sensitivity and prevention of malfunction.

DESCRIPTION OF EMBODIMENTS

Figure 1:
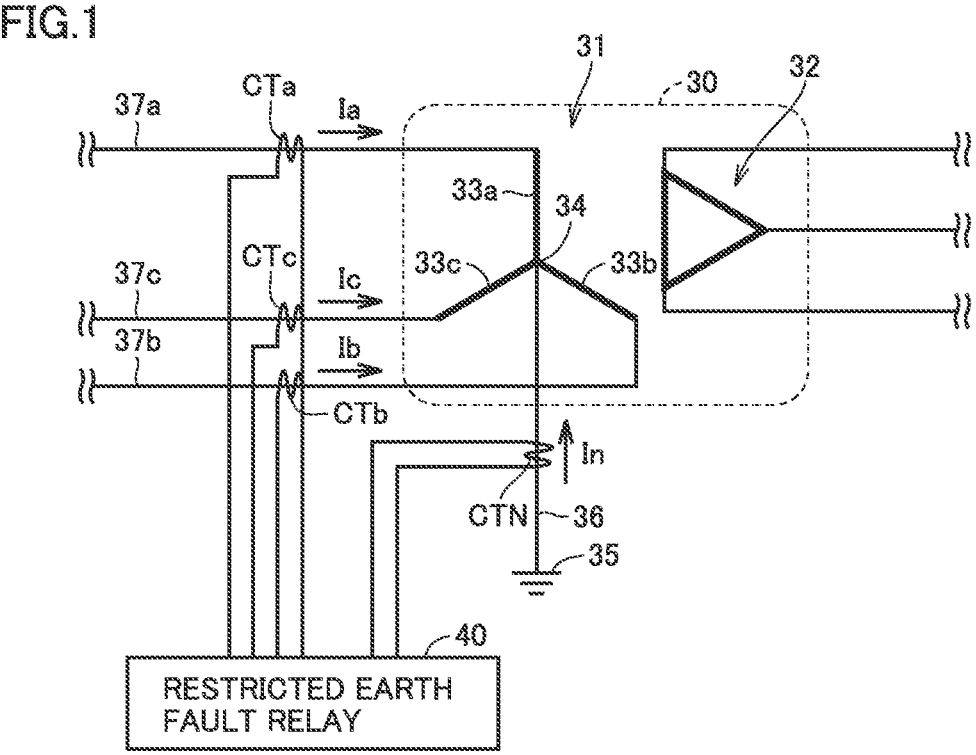
FIG. 1 is an overall configuration diagram including a restricted earth fault relay and a three-phase transformer.

Embodiments will be described hereinafter with reference to the drawings. In the following description, the same components are denoted by the same reference characters. Their names and functions are also the same. Therefore, detailed description about them will not be repeated.

First Embodiment

Overall Configuration

FIG. 1 is an overall configuration diagram including a restricted earth fault relay and a three-phase transformer.

Referring to FIG. 1, a restricted earth fault relay 40 protects a three-phase transformer 30 including a Y-connected winding. Three-phase transformer 30 is a three-phase transformer of Y-Δ connection type including a primary-side winding 31 that is a Y winding, and a secondary-side winding 32 that is a Δ winding. Primary-side winding 31 is composed of an a-phase winding 33a, a b-phase winding 33b and a c-phase winding 33c.

Current transformers CTa, CTb and CTc are provided on the lines of the phases on the primary side of three-phase transformer 30. Current transformer CTa detects an a-phase current Ia flowing through an a-phase line 37a, current transformer CTb detects a b-phase current Ib flowing through a b-phase line 37b, and current transformer CTc detects a c-phase current Ic flowing through a c-phase line 37c. In addition, a current transformer CTN is provided on a ground line 36 that connects a neutral point 34 of primary-side winding 31 and a ground electrode 35. Current transformer CTN detects a neutral point current In. Signals indicating these phase currents Ia, Ib and Ic and a signal indicating neutral point current In are input to restricted earth fault relay 40.

A-phase current Ia, b-phase current Ib, c-phase current Ic, and neutral point current In are defined to have the same polarity (e.g., positive) in a current direction toward neutral point 34 of three-phase transformer 30.

Restricted earth fault relay 40 is implemented by, for example, a microcomputer-based digital protection relay. When restricted earth fault relay 40 determines the occurrence of an internal ground fault based on a differential amount and a suppression amount, restricted earth fault relay 40 outputs a protection signal (e.g., trip signal) for protecting three-phase transformer 30 to a not-shown circuit breaker in order to separate three-phase transformer 30 from a power system. The circuit breaker is usually arranged closer to three-phase transformer 30 than current transformers CTa, CTb, CTc, and CTN. The circuit breaker is opened in accordance with the protection signal, and three-phase transformer 30 is thereby separated from the power system. An internal fault refers to a fault that occurs in an internal protected section surrounded by current transformers CTa, CTb, CTc, and CTN. On the other hand, an external fault refers to a fault that occurs in a section located outside current transformers CTa, CTb, CTc, and CTN.

Hardware Configuration

Figure 2:
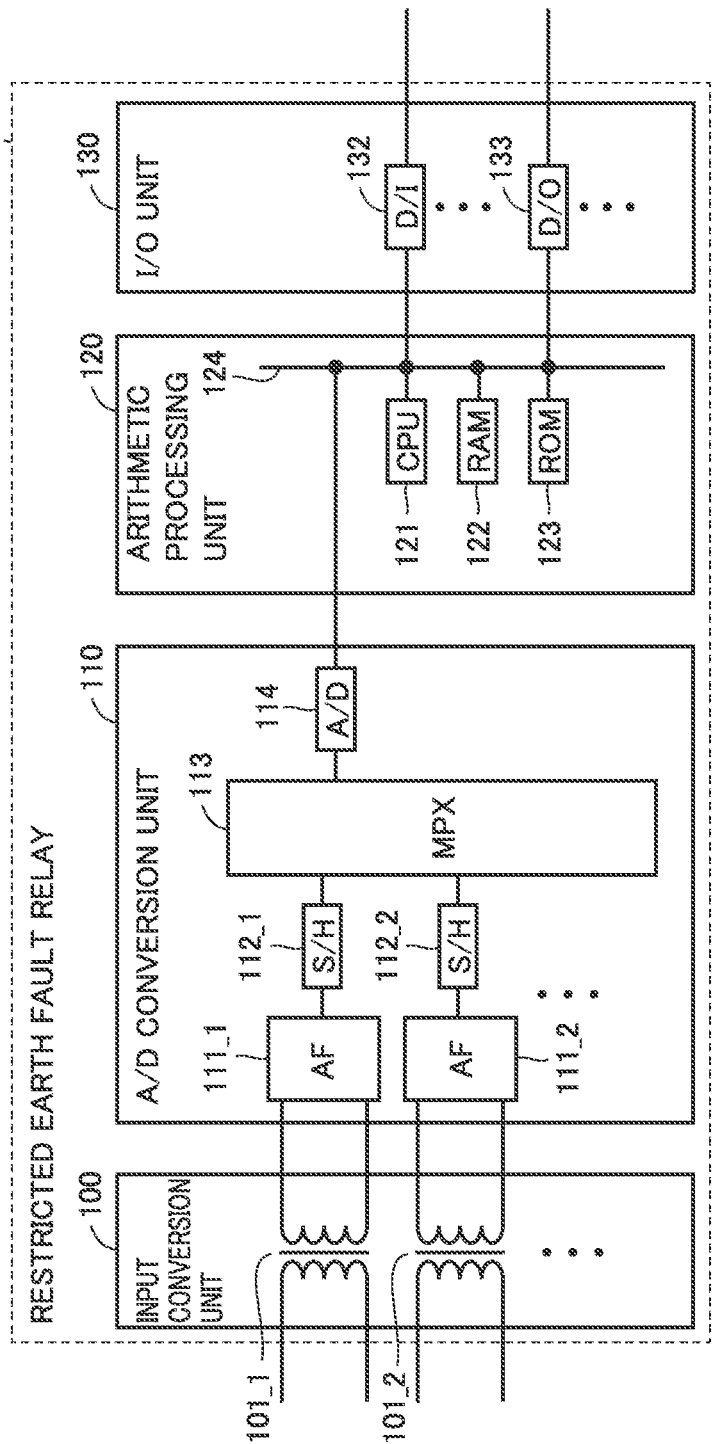
FIG. 2 is a block diagram showing an example hardware configuration of the restricted earth fault relay.

FIG. 2 is a block diagram showing an example hardware configuration of restricted earth fault relay 40. Referring to FIG. 2, restricted earth fault relay 40 is configured similarly to a so-called digital protection relay device. Specifically, restricted earth fault relay 40 includes an input conversion unit 100, an A/D conversion unit 110, an arithmetic processing unit 120, and an input and output (I/O) unit 130.

Input conversion unit 100 includes auxiliary transformers 101_1, 101_2, . . . for the respective input channels. Input conversion unit 100 receives the signals indicating phase currents Ia, Ib and Ic output from current transformers CTa, CTb and CTc, respectively, and the signal indicating neutral point current In output from current transformer CTN. Auxiliary transformers 101 convert the current signals output from current transformers CTa, CTb, CTc, and CTN into signals having a voltage level suitable for signal processing in A/D conversion unit 110 and arithmetic processing unit 120.

A/D conversion unit 110 includes analog filters (AFs) 111_1, 111_2, . . . , sample hold circuits (S/Hs) 112_1, 112_2, . . . , a multiplexer (MPX) 113, and an A/D converter 114. Analog filters 111 and sample hold circuits 112 are provided for the respective input signal channel.

Each analog filter 111 is a low-pass filter provided to remove an aliasing error during A/D conversion. Each sample hold circuit 112 samples, at a defined sampling frequency, a signal passing through corresponding analog filter 111, and holds the signal. The sampling frequency is, for example, 4800 Hz. Multiplexer 113 sequentially selects the voltage signals held in sample hold circuits 112_1, 112_2, . . . . A/D converter 114 converts the signal selected by multiplexer 113 into a digital value.

Arithmetic processing unit 120 includes a central processing unit (CPU) 121, a random access memory (RAM) 122, a read only memory (ROM) 123, and a bus 124 that connects these components. CPU 121 controls the overall operation of restricted earth fault relay 40. RAM 122 and ROM 123 are used as a main memory of CPU 121. By using a non-volatile memory such as a flash memory, ROM 123 can store a program, a set value for signal processing, and the like.

I/O unit 130 includes a digital input (D/I) circuit 132 and a digital output (D/O) circuit 133. Digital input circuit 132 and digital output circuit 133 are interface circuits when communication is performed between CPU 121 and an external device.

At least a part of restricted earth fault relay 40 may be implemented by a circuit such as a field programmable gate array (FPGA) and an application specific integrated circuit (ASIC).

Functional Configuration

Figure 3:
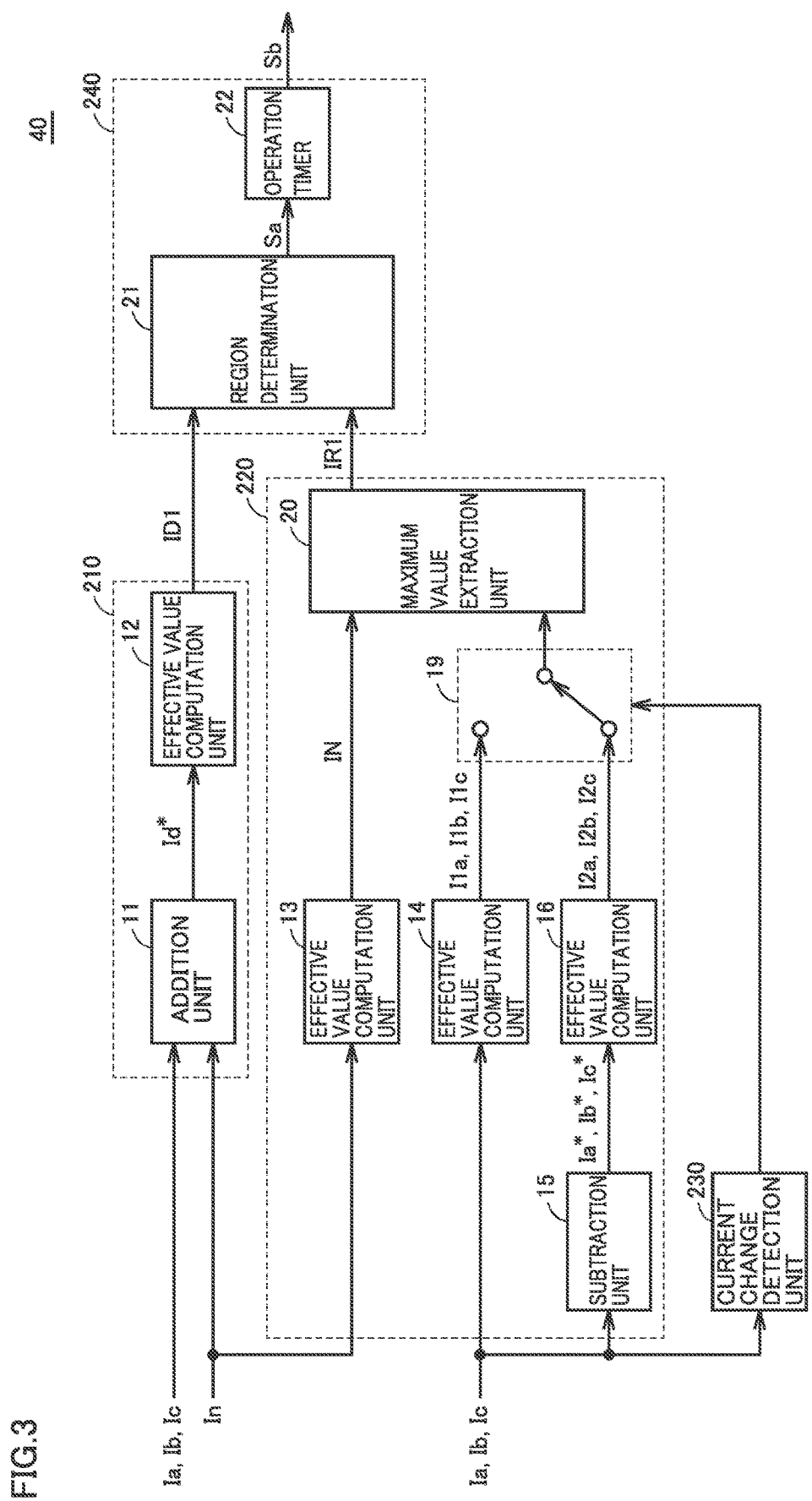
FIG. 3 is a block diagram showing an example functional configuration of the restricted earth fault relay according to a first embodiment.

FIG. 3 is a block diagram showing an example functional configuration of the restricted earth fault relay according to the first embodiment. Referring to FIG. 3, restricted earth fault relay 40 includes, as main functional components, a differential amount calculation unit 210, a suppression amount calculation unit 220, a current change detection unit 230, and an operation determination unit 240. Each of these components may be implemented by, for example, a processing circuit. The processing circuit may be dedicated hardware, or may be CPU 121 that executes a program stored in an internal memory of restricted earth fault relay 40. When the processing circuit is dedicated hardware, the processing circuit is implemented by, for example, an FPGA, an ASIC, or a combination thereof.

Differential amount calculation unit 210 calculates a differential amount ID1 based on a zero-phase current and neutral point current In, the zero-phase current being based on phase currents Ia, Ib and Ic. Specifically, differential amount calculation unit 210 includes an addition unit 11 and an effective value computation unit 12. Addition unit 11 calculates a zero-phase current 10 based on the information of phase currents Ia, Ib and Ic received from current transformers CTa, CTb and CTc. Zero-phase current I0 is defined as $I0=(Ia+Ib+Ic)/3$. In the present specification, for the sake of convenience, a triple of zero-phase current I0 (i.e., $3 \times I0$) may be simply referred to as "zero-phase current". Addition unit 11 outputs, to effective value computation unit 12, an addition current Id* obtained by adding the zero-phase current (i.e., $3 \times I0$) and neutral point current In. Effective value computation unit 12 calculates an effective value of addition current Id* as differential amount ID1.

Figure 4:
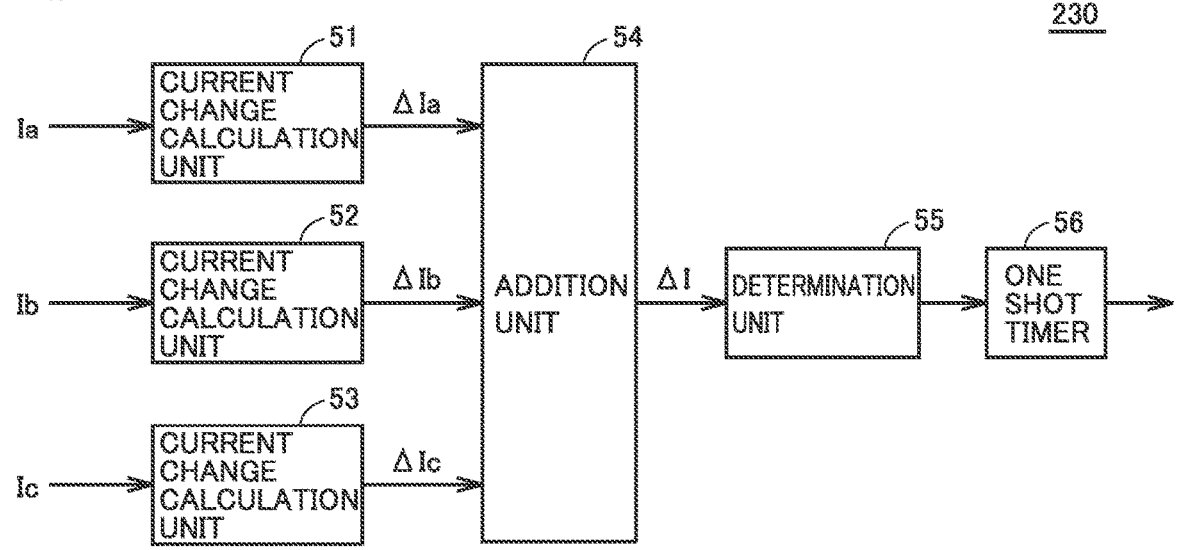
FIG. 4 is a block diagram showing an example functional configuration of a current change detection unit according to the first embodiment.

Current change detection unit 230 detects changes in phase currents Ia, Ib and Ic. FIG. 4 is a block diagram showing an example functional configuration of current change detection unit 230 according to the first embodiment. Referring to FIG. 4, current change detection unit 230 includes current change calculation units 51 to 53, an addition unit 54, a determination unit 55, and a one shot timer 56.

Current change calculation units 51, 52 and 53 calculate changes $\Delta Ia$, $\Delta Ib$ and $\Delta Ic$ in the phase currents, respectively. For example, the changes in the phase currents are defined by absolute values of subtraction values obtained by subtracting absolute values of instantaneous values at a time point earlier by $\alpha$ cycles (e.g., 0.5) than a current time point from absolute values of instantaneous values at the current time point. $\alpha = i/2$ and i is an integer equal to or larger than 1. A time period $T\alpha$ is a time period corresponding to the $\alpha$ cycles. Specifically, $\Delta Ia = ||Ia(t)| - |Ia(t-T\alpha)||$, $\Delta Ib = ||Ib(t)| - |Ib(t-T\alpha)||$, and $\Delta Ic = ||Ic(t)| - |Ic(t-T\alpha)||$.

Addition unit 54 adds changes $\Delta Ia$, $\Delta Ib$ and $\Delta Ic$ to thereby calculate an addition value $\Delta I(=\Delta Ia+\Delta Ib+\Delta Ic)$. Determination unit 55 determines whether addition value $\Delta I$ is equal to or larger than a threshold value J. Determination unit 55 outputs a signal indicating that the phase currents have changed (e.g., signal having the value "1") when addition value $\Delta I$ is equal to or larger than threshold value J, and outputs a signal indicating that the phase currents have not changed (e.g., signal having the value "0") when addition value $\Delta I$ is less than threshold value J.

When determination unit 55 outputs the signal having the value "1", one shot timer 56 maintains the value for a time period T1 and outputs the signal to suppression amount calculation unit 220. After time period T1 elapses, one shot timer 56 outputs the signal having the value "0" to suppression amount calculation unit 220.

As for the phase currents in a normal state in which there is no fault, the subtraction values obtained by subtracting the absolute values of the instantaneous values at the time point earlier by $\alpha$ cycles than the current time point from the absolute values of the instantaneous values at the current time point are zero, and thus, no current changes are detected. In contrast, when a fault occurs, the subtraction values are not zero, and thus, current changes are detected. Therefore, when above-described current change detection unit 230 detects the current changes, the occurrence of some sort of fault is conceivable. In addition, since the current changes are defined by the absolute values, the computation time is short, and thus, the current changes can be detected in a short time after the occurrence of the fault. For example, a maximum value of a detection time period from the occurrence of a ground fault to the detection of current changes by current change detection unit 230 is a time period corresponding to 0.5 cycles. Since the time period corresponding to the $\alpha$ cycles is set at a time period that is equal to or larger than the maximum value of the detection time period, $\alpha$ is set at a value that is equal to or larger than the 0.5 cycles. In the present embodiment, $\alpha$ is set at, for example, 0.5.

Referring again to FIG. 3, suppression amount calculation unit 220 calculates a suppression amount IR1 based on a result of detection by current change detection unit 230, phase currents Ia, Ib and Ic, and neutral point current In. Specifically, suppression amount calculation unit 220 includes effective value computation units 13, 14 and 16, a subtraction unit 15, a selection unit 19, and a maximum value extraction unit 20.

Effective value computation unit 13 calculates an effective value IN of neutral point current In. Effective value computation unit 14 calculates an effective value I1a of a-phase current Ia, an effective value I1b of b-phase current Ib, and an effective value I1c of c-phase current Ic.

Subtraction unit 15 calculates, as subtraction currents for respective phase currents Ia, Ib and Ic, currents obtained by subtracting the phase currents in a cycle earlier by n cycles than a current cycle from the phase currents in the current cycle. Specifically, subtraction unit 15 calculates subtraction currents Ia*, Ib* and Ic* obtained by subtracting the instantaneous values at a time point earlier by n cycles than a current time point from the instantaneous values at the current time point. That is, Ia*=Ia(t)−Ia(t−Tn), Ib*=Ib(t)−Ib(t−Tn), and Ic*=Ic(t)−Ic(t−Tn). n is an integer equal to or larger than 1, and is, for example, 2. A time period Tn is a time period corresponding to the n cycles. Subtraction currents Ia*, Ib* and Ic* are currents in which the influence of the load current is removed. The instantaneous values of phase currents Ia, Ib and Ic are sequentially stored in a not-shown memory. Therefore, the instantaneous values at the time point earlier by n cycles than the current time point are obtained from the memory.

Effective value computation unit 16 calculates an effective value I2a of subtraction current Ia*, an effective value I2b of subtraction current Ib*, and an effective value I2c of subtraction current Ic*.

Selection unit 19 selects either effective values I1a to I1c or effective values I2a to I2c based on a result of detection by current change detection unit 230, and outputs the selected effective values to maximum value extraction unit 20. Specifically, selection unit 19 selects effective values I1a to I1c when the changes in phase currents Ia to Ic are not detected by current change detection unit 230, and selects effective values I2a to I2c when the changes in phase currents Ia to Ic are detected. More specifically, selection unit 19 selects effective values I1a to I1c during a period in which the value "0" is output from one shot timer 56 in FIG. 4, and selects effective values I2a to I2c during a period in which the value "1" is output from one shot timer 56.

Maximum value extraction unit 20 extracts a maximum value of the effective values selected by selection unit 19 and effective value IN of neutral point current In, and calculates the maximum value as suppression amount IR1. More specifically, maximum value extraction unit 20 calculates a maximum value of effective values I1a to I1c and IN as suppression amount IR1 when the changes in the phase currents are not detected (i.e., when the value "0" is output from one shot timer 56), and calculates a maximum value of effective values I2a to I2c and IN as suppression amount IR1 when the changes in the phase currents are detected (e.g., when the value "1" is output from one shot timer 56).

Operation determination unit 240 outputs the protection signal for protecting three-phase transformer 30, when differential amount ID1 and suppression amount IR1 are within an operating region. Specifically, operation determination unit 240 includes a region determination unit 21 and an operation timer 22.

Region determination unit 21 determines whether differential amount ID1 and suppression amount IR1 are within the operating region, in accordance with the following equations (1) and (2):

$$ID1 > K1 \tag{1}$$

$$ID1 > p1 \times IR1, \tag{2}$$

where K1 represents a settled value indicating the minimum operation sensitivity (hereinafter, referred to as "minimum sensitivity value K1"), and p1 represents a ratio settled to prevent the operation caused by a CT error and the like. Determination is made in accordance with the equation (1) when suppression amount IR1 is equal to or smaller than K1/p1, and determination is made in accordance with the equation (2) when suppression amount IR1 is larger than K1/p1.

Figure 5:
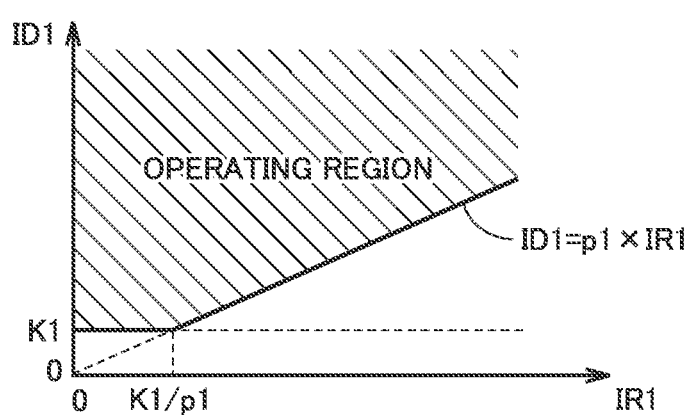
FIG. 5 is an operational characteristic diagram of the restricted earth fault relay according to the first embodiment.

FIG. 5 is an operational characteristic diagram of the restricted earth fault relay according to the first embodiment. In FIG. 5, the vertical axis represents differential amount ID1, and the horizontal axis represents suppression amount IR1. Referring to FIG. 5, restricted earth fault relay 40 is configured such that the operating region satisfies both the above-described equations (1) and (2). For example, when the point (IR1, ID1) indicating suppression amount IR1 and differential amount ID1 is within the operating region, region determination unit 21 outputs a signal Sa having the value "1". In contrast, when the point (IR1, ID1) is not within the operating region, region determination unit 21 outputs signal Sa having the value "0".

Referring again to FIG. 3, when signal Sa having the value "1" that is output from region determination unit 21 continues for a time period T2 or longer, operation timer 22 outputs a signal Sb having the value "1". Signal Sb having the value "1" corresponds to the protection signal for protecting three-phase transformer 30. With the above-described configuration, when differential amount ID1 and suppression amount IR1 are within the operating region for time period T2 or longer, operation determination unit 240 outputs the protection signal to the circuit breaker and separates three-phase transformer 30 from the power system.

According to the restricted earth fault relay shown in FIG. 3, current change detection unit 230 outputs the value "1" until time period T1 elapses since the detection of the changes in the phase currents, and outputs the value "0" after time period T1 elapses. Thus, suppression amount calculation unit 220 calculates the maximum value of effective values I2a to I2c and IN as suppression amount IR1 until time period T1 elapses since the detection of the changes in the phase currents. After time period T1 elapses since the detection of the changes in the phase currents, suppression amount calculation unit 220 calculates the maximum value of effective values I1a to I1c and IN as suppression amount IR1. Time period T1 is shorter than time period Tn corresponding to the n cycles, and is set at, for example, a time period corresponding to a (n−α) cycle.

A time period required for operation determination based on differential amount ID1 and suppression amount IR1 at the time of a fault is approximately one cycle. Therefore, when n=2 and α=0.5 are set, for example, suppression amount IR1 is calculated in accordance with a maximum value suppression method using effective values I2a to I2c, during a time period of 1.5 cycles after the occurrence of a fault. During this time period, the influence of the load current is removed. Therefore, even when an internal fault in which a fault current is smaller than a load current and a neutral point current is small occurs, for example, the internal fault can be detected with high sensitivity. The value of n may be made larger (e.g., n=3) in order to increase a margin of the time period required for operation determination.

Operation Example At the Time of Fault (At the Time of Internal Fault)

Figure 6:
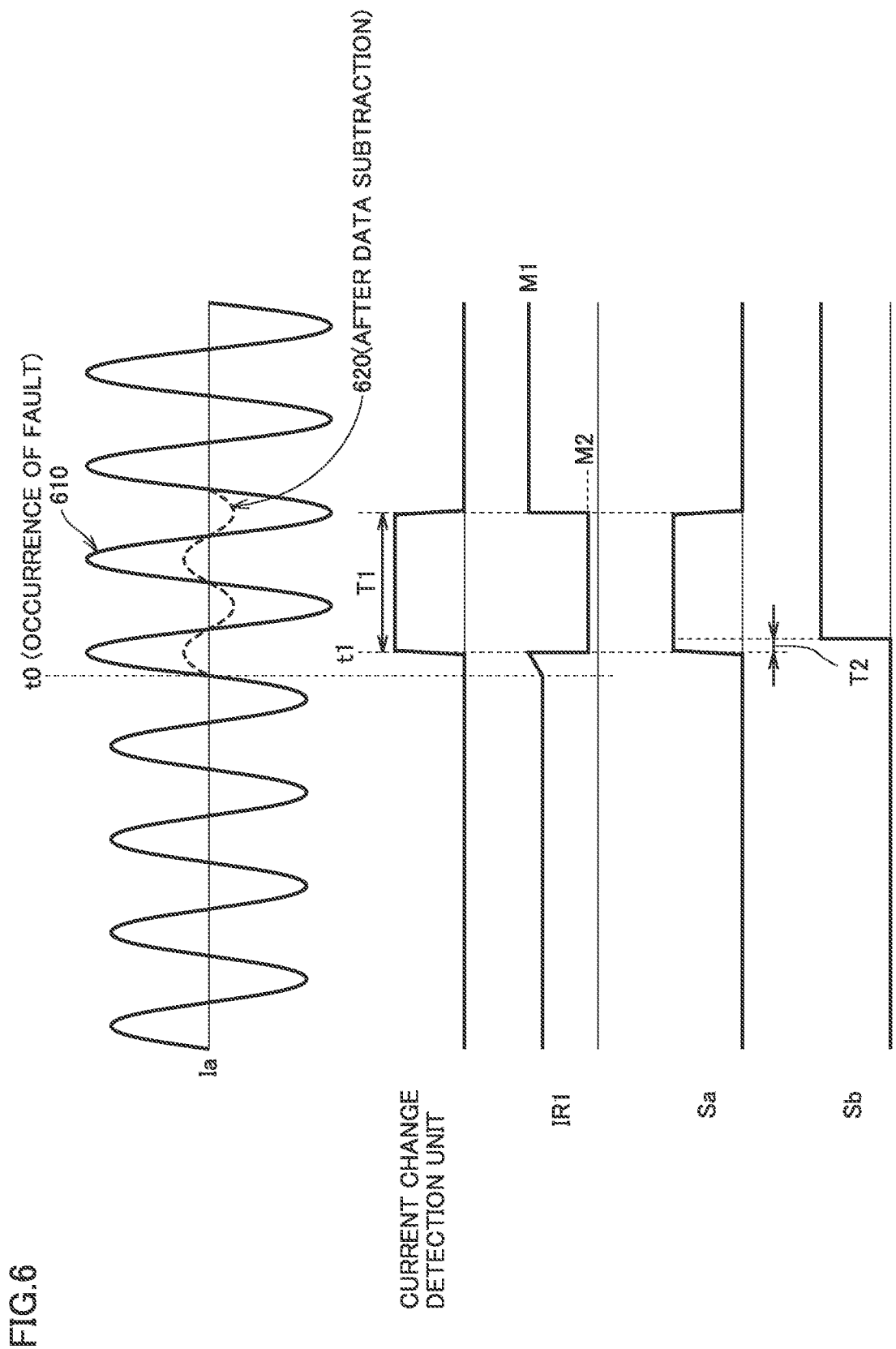
FIG. 6 is a timing chart for illustrating an operation at the time of an internal ground fault in the restricted earth fault relay according to the first embodiment.

FIG. 6 is a timing chart for illustrating an operation at the time of an internal ground fault in the restricted earth fault relay according to the first embodiment. In FIG. 6, it is assumed that the neutral point current is small when an internal ground fault occurs in the a phase (e.g., an internal ground fault occurs near the neutral point and the fault current itself is small). In addition, it is assumed that n=2 and α=0.5.

Referring to FIG. 6, a waveform 610 is a waveform indicating a-phase current Ia, and a waveform 620 is a waveform indicating subtraction current Ia* of the a phase. As shown by waveform 610, when an internal fault occurs at time t0, a-phase current Ia becomes larger. In contrast, as shown by waveform 620, although subtraction current Ia* is zero before the internal fault occurs, subtraction current Ia* corresponds to an a-phase fault current from which the load current is removed, after the internal fault occurs.

Current change detection unit 230 outputs a signal having the value "1" at time t1 that is later by ¼ cycles than time t0. This value "1" is maintained only for time period T1 corresponding to the (n−α) cycle (i.e., 1.5 cycles) after time t1. In the example of FIG. 6, the time period of detection by current change detection unit 230 (i.e., time period from time to t0 time t1) is a time period corresponding to the ¼ cycles.

At time t1, suppression amount IR1 reaches a maximum value M2 of effective values I2a to I2c and IN. After time period T1 elapses since time t1, suppression amount IR1 reaches a maximum value M1 of effective values I1a to I1c and IN. Since maximum value M2 is calculated by using effective values I2a to I2c from which the load current is removed, maximum value M2 is smaller than maximum value M1.

Since suppression amount IR1 reaches maximum value M2 at time t1, suppression amount IR1 and differential amount ID1 are within the operating region. Therefore, signal Sa output from region determination unit 21 has the value "1". Then, after time period T2 elapses since time t1, signal Sb has the value "1", and the protection signal for three-phase transformer 30 is output to the circuit breaker. Thus, it is understood that the current changes can be instantaneously detected at the time of the occurrence of the fault and maximum value M2 calculated by using effective values I2a to I2c from which the load current is removed can be referenced as suppression amount IR1, and thus, the internal fault can be detected with high sensitivity.

(At the Time of External Fault)

Figure 7:
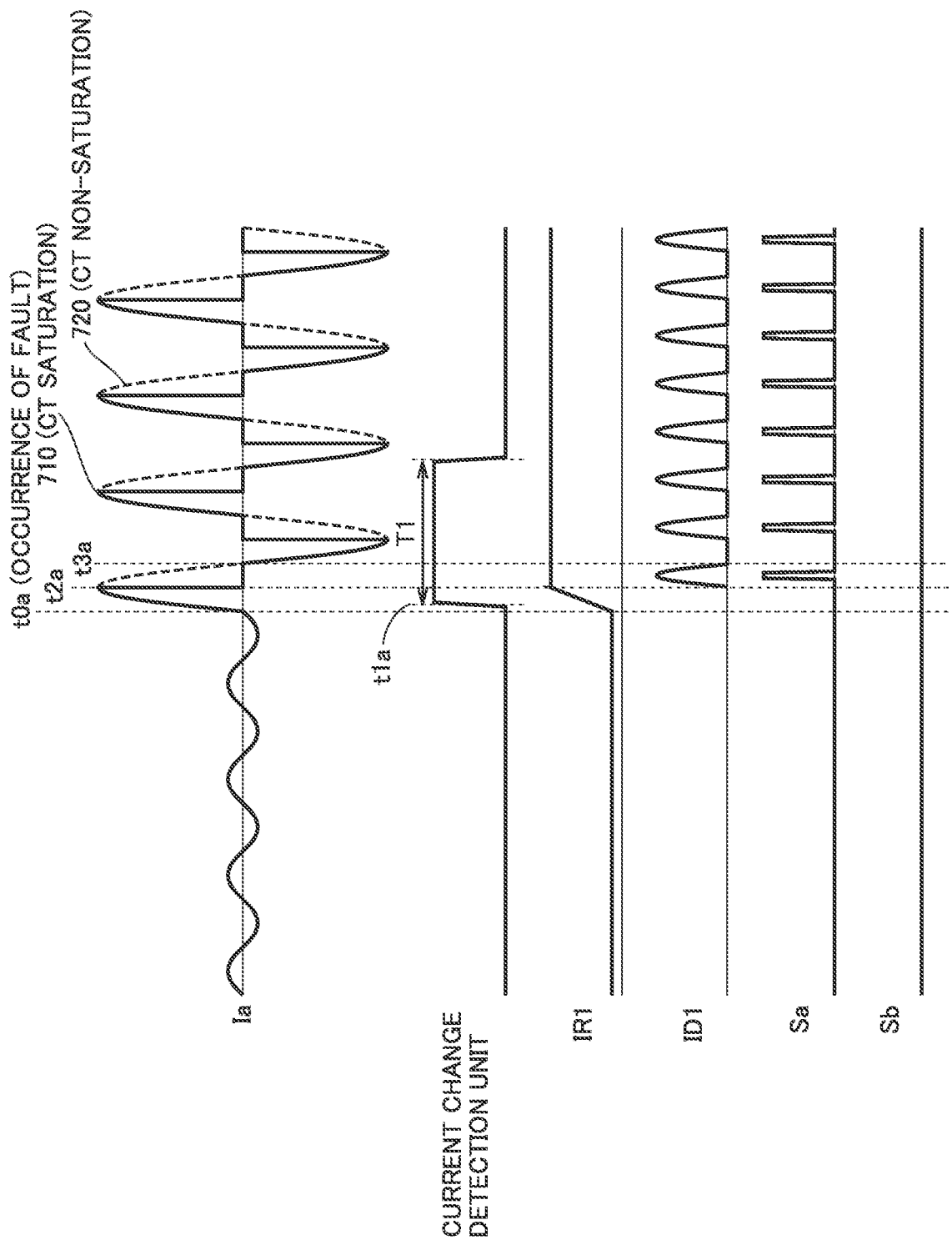
FIG. 7 is a timing chart for illustrating an operation when CT saturation occurs at the time of an external fault, in the restricted earth fault relay according to the first embodiment.

FIG. 7 is a timing chart for illustrating an operation when CT saturation occurs at the time of an external fault in the restricted earth fault relay according to the first embodiment. In FIG. 7, it is assumed that current transformer CTa in the a phase is saturated at the time of an external fault (e.g., three-phase short-circuit external fault) in which a fault current becomes larger as CT saturation occurs. In addition, it is assumed that n=2 and α=0.5.

Referring to FIG. 7, a waveform 710 represents a CT saturation waveform of a-phase current Ia. For comparison with the CT saturation waveform, a waveform 720 is shown as a CT non-saturation waveform of a-phase current Ia. As shown by waveform 710, when an external fault occurs at time t0a, a-phase current Ia becomes larger sharply. CT saturation occurs at time t2a, and recovery from CT saturation occurs at time t3a. Thereafter, a-phase current Ia repeats the occurrence of CT saturation and the recovery from CT saturation.

Current change detection unit 230 outputs a signal having the value "1" at time t1a that is later by 1/12 cycles than time t0a. The value "1" is maintained only for time period T1 corresponding to the (n−α) cycle (i.e., 1.5 cycles) after time t1a.

In FIG. 6 in which it is assumed that the neutral point current is small when the internal ground fault occurs in the a phase, the time period of detection by current change detection unit 230 is a time period corresponding to the ¼ cycles. However, in FIG. 7, the time period of detection of the current change by current change detection unit 230 is a time period corresponding to the 1/12 cycles (i.e., time period from time t0a to time t1a) and is shorter than the detection time period in FIG. 6. This is because the external fault (e.g., three-phase short-circuit external fault) in which the fault current becomes larger as CT saturation occurs is assumed in FIG. 7. Specifically, this is because when the fault current becomes larger, the current change also becomes larger and the time period of detection of the current change by current change detection unit 230 becomes shorter.

At time t1a, suppression amount IR1 reaches maximum value M2 of effective values I2a to I2c and IN. After time period T1 elapses since time t1a, suppression amount IR1 reaches maximum value M1 of effective values I1a to I1c and IN. However, in the case of the external fault in which the fault current becomes larger as CT saturation occurs, the load current is smaller than the fault current, and thus, there is no difference between maximum value M1 and maximum value M2. Therefore, after time t2a, suppression amount IR1 is maintained constant at a relatively large value. Specifically, although saturation of the single-phase current transformer (in this case, CTa) causes great waveform disturbance, it is understood that the sufficient suppression amount can be ensured in the present embodiment because of the use of the maximum value suppression method in which the maximum value of the phase currents and the neutral point current is used as the suppression amount.

Differential amount ID1 has a value larger than zero at the time of the occurrence of CT saturation, and is zero at the time of CT non-saturation. Specifically, differential amount ID1 changes as shown in FIG. 8.

Figure 8:
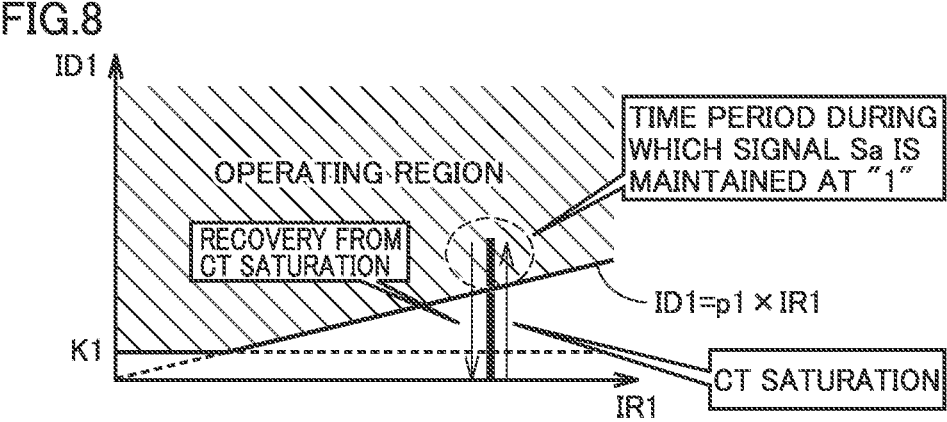
FIG. 8 is a diagram for illustrating transition of a differential amount at the time of CT saturation and at the time of CT non-saturation.

FIG. 8 is a diagram for illustrating transition of the differential amount at the time of CT saturation and at the time of CT non-saturation. Differential amount ID1 becomes larger when CT saturation progresses, and differential amount ID1 becomes smaller when recovery from CT saturation occurs. Therefore, as to signal Sa output from region determination unit 21, differential amount ID1 and suppression amount IR1 enters the operating region when CT saturation progresses, and differential amount ID1 and suppression amount IR1 exit from the operating region when recovery from CT saturation occurs. Even when CT saturation occurs, a time period during which differential amount ID1 and suppression amount IR1 are within the operating region is short because the sufficient suppression amount can be ensured. That is, a time period during which signal Sa is maintained at the value "1" is short. Therefore, since this time period is less than time period T2 of operation timer 22, signal Sb does not have the value "1" as shown in FIG. 7, and thus, the protection signal is not output. That is, it is understood that malfunction of restricted earth fault relay 40 at the time of the occurrence of the external fault can be prevented.

Modification (Functional Configuration)

Figure 9:
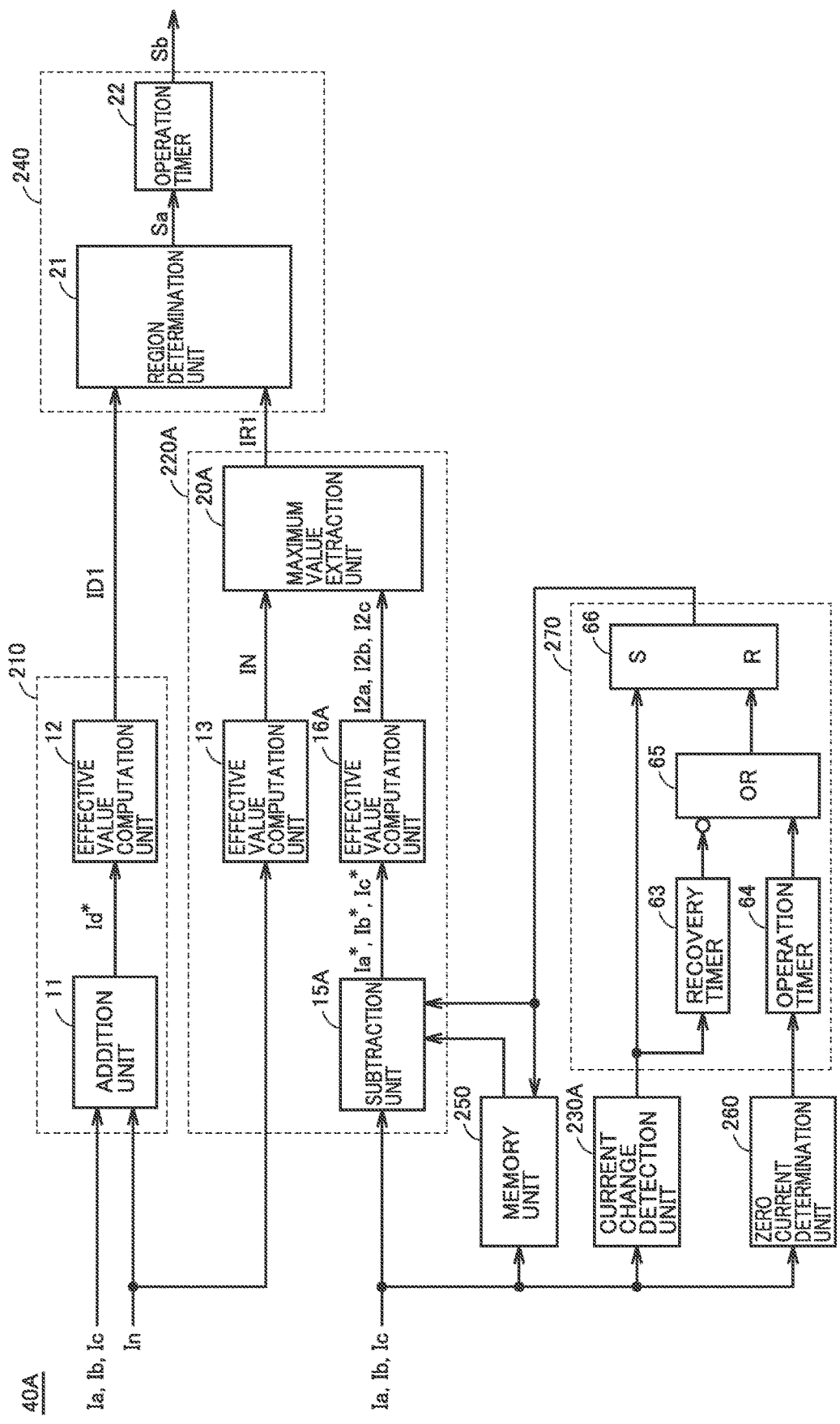
FIG. 9 is a block diagram showing an example functional configuration of a restricted earth fault relay according to a modification of the first embodiment.

FIG. 9 is a block diagram showing an example functional configuration of a restricted earth fault relay according to a modification of the first embodiment. Referring to FIG. 9, restricted earth fault relay 40A includes, as main functional components, differential amount calculation unit 210, a suppression amount calculation unit 220A, a current change detection unit 230A, operation determination unit 240, a memory unit 250, a zero current determination unit 260, and a setting unit 270. Each of these components is implemented by, for example, a processing circuit. Since the configurations of differential amount calculation unit 210 and operation determination unit 240 are the same as those described with reference to FIG. 3, detailed description thereof will not be repeated.

Current change detection unit 230A corresponds to a configuration obtained by deleting one shot timer 56 from the configuration of current change detection unit 230 in FIG. 4. Current change detection unit 230A outputs, as a result of detection, a signal indicating that the phase currents have changed (e.g., signal having the value "1") or a signal indicating that the phase currents have not changed (e.g., signal having the value "0").

Zero current determination unit 260 determines whether at least one of the effective values of phase currents Ia, Ib and Ic becomes zero. For example, zero current determination unit 260 outputs, as a result of determination, a signal indicating that at least one effective value is zero (e.g., signal having the value "1") or a signal indicating that all of the effective values are not zero (e.g., signal having the value "0").

Setting unit 270 outputs a set signal or a reset signal to memory unit 250 and subtraction unit 15A based on the result of detection by current change detection unit 230A and the result of determination by zero current determination unit 260. Specifically, setting unit 270 includes a recovery timer 63, an operation timer 64, an OR gate 65, and an SR circuit 66.

When current change detection unit 230A outputs the value "1" (i.e., when the current changes are detected by current change detection unit 230A), SR circuit 66 holds the set signal and outputs the set signal to memory unit 250 and subtraction unit 15A.

When current change detection unit 230A outputs the value "1", recovery timer 63 maintains the value for a time period Ta. After time period Ta elapses, recovery timer 63 outputs the value "0". Time period Ta is set at a time period during which a fault is expected to be removed after restricted earth fault relay 40 outputs the protection signal. When the value "1" output from zero current determination unit 260 continues for a time period Tb or longer, operation timer 64 outputs the value "1".

OR gate 65 performs an OR operation on a value obtained by inverting a logic level of the output from recovery timer 63 and the output value of operation timer 64. Specifically, OR gate 65 outputs the value "1" when the value "0" is output from recovery timer 63 (e.g., after time period Ta elapses since the current changes are detected by current change detection unit 230A) or the value "1" is output from operation timer 64 (e.g., the value "1" output from zero current determination unit 260 continues for time period Tb or longer), and otherwise outputs the value "0".

When SR circuit 66 receives an input of the value "1" from OR gate 65, SR circuit 66 resets the set signal and outputs the reset signal to memory unit 250 and subtraction unit 15A.

As described above, setting unit 270 outputs the set signal when the changes in the phase currents are detected by current change detection unit 230A. In addition, setting unit 270 outputs the reset signal when time period Ta has elapsed since the changes in the phase currents were detected by current change detection unit 230A (e.g., when the value "0" is output from recovery timer 63) or when a time period during which at least one of the effective values of the phase currents is zero continues for time period Tb or longer (e.g., when the value "1" is output from operation timer 64).

Memory unit 250 stores the instantaneous values of phase currents Ia, Ib and Ic sequentially. Specifically, when memory unit 250 does not receive the set signal from setting unit 270, memory unit 250 holds the instantaneous values of phase currents Ia, Ib and Ic in the latest m cycles (where m is an integer equal to or larger than 1, satisfying m≥n). That is, memory unit 250 holds the instantaneous values of phase currents Ia, Ib and Ic in a time period from a current time point to a time point earlier by m cycles than the current time point. In contrast, when memory unit 250 receives the set signal, memory unit 250 stops storing latest phase currents Ia, Ib and Ic sequentially, and holds the instantaneous values of phase currents Ia, Ib and Ic in a time period from a time point of reception of the set signal (i.e., time point of detection of the changes in the phase currents) to a time point earlier by m cycles than the time point of reception. In addition, when memory unit 250 receives the reset signal from setting unit 270, memory unit 250 restarts storing latest phase currents Ia, Ib and Ic sequentially, and holds the instantaneous values of phase currents Ia, Ib and Ic in the latest m cycles.

Suppression amount calculation unit 220A includes effective value computation units 13 and 16A, subtraction unit 15A and a maximum value extraction unit 20A. Effective value computation unit 13 calculates effective value IN of neutral point current In.

When subtraction unit 15A does not receive the set signal, subtraction unit 15A calculates subtraction currents Ia*, Ib* and Ic* obtained by subtracting the instantaneous values of phase currents Ia, Ib and Ic at a time point earlier by n cycles than a current time point from the instantaneous values of phase currents Ia, Ib and Ic at the current time point. Subtraction unit 15A obtains, from memory unit 250, the instantaneous values at the time point earlier by n cycles than the current time point.

In contrast, when subtraction unit 15A receives the set signal, subtraction unit 15A obtains, from memory unit 250, the instantaneous values of phase currents Ia, Ib and Ic in a reference cycle. The reference cycle indicates one cycle earlier by m cycles than the time point of reception of the set signal (i.e., time point of detection of the changes in the phase currents). Subtraction unit 15A calculates, as the subtraction currents for the respective phase currents, currents obtained by subtracting the phase currents in the reference cycle from the phase currents in the current cycle. Specifically, subtraction unit 15A calculates, as subtraction currents Ia*, Ib* and Ic*, currents obtained by subtracting the instantaneous values of phase currents Ia, Ib and Ic in the reference cycle from the instantaneous values of phase currents Ia, Ib and Ic in the current cycle.

A method for calculation by subtraction unit 15A when n and m are, for example, "2" will be described. Let us assume that the changes in the phase currents are detected by current change detection unit 230A at time t1 in FIG. 6.

Data in one cycle earlier by m cycles than time t1 as a starting point (i.e., data in the reference cycle) is applied as data on the subtrahend side (i.e., number-to-be-subtracted side). Here, Tm represents a time period corresponding to the m cycles, Ts represents one sampling time period, Tc represents a time period corresponding to one cycle, and subtraction currents Ia*, Ib* and Ic* are collectively denoted as "Isu".

A subtraction current at time (t1+k×Ts) that is later by k sampling time periods (k is a positive integer) than time t1 is denoted as Isu(t1+k×Ts). In this case, for example, Isu(t1)=I(t1)−I(t1−Tm), Isu(t1+Ts)=I(t1+Ts)−I(t1−Tm+Ts), and Isu(t1+2Ts)=I(t1+2Ts)−I(t1−Tm+2Ts).

A subtraction current at time (t1+j×Tc) that is later by j cycles (j is a positive integer) than time t1 is denoted as Isu(t1+j×Tc). In this case, Isu(t1+Tc)=I(t1+Tc)−I(t1−Tm), Isu(t1+Tc+Ts)=I(t1+Tc+Ts)−I(t1−Tm+Ts), and Isu(t1+Tc+2Ts)=I(t1+Tc+2Ts)−I(t1−Tm+2Ts). Based on the foregoing, the current value on the subtrahend side at time (t1+k×Ts) and the current value on the subtrahend side at time (t1+j×Tc+k×Ts) are the same, which are denoted as I(t1−Tm+k×Ts).

According to the foregoing, when the changes in the phase currents are detected, subtraction unit 15A calculates, as the subtraction currents for the respective phase currents, currents obtained by subtracting the phase currents in the reference cycle from the phase currents in the current cycle. In addition, when time period Ta has elapsed since the detection of the changes in the phase currents or when at least one of the effective values of the phase currents becomes zero, subtraction unit 15A calculates, as the subtraction currents for the respective phase currents, currents obtained by subtracting the phase currents in a cycle earlier by n cycles than the current cycle from the phase currents in the current cycle.

Effective value computation unit 16A calculates effective value I2$a$ of subtraction current Ia*, effective value I2$b$ of subtraction current Ib*, and effective value I2$c$ of subtraction current Ic*. Maximum value extraction unit 20A calculates a maximum value of effective values I2$a$ to I2$c$ and IN as suppression amount IR1.

As described above, suppression amount calculation unit 220A is different from suppression amount calculation unit 220 in FIG. 3 in that suppression amount calculation unit 220A calculates suppression amount IR by constantly using effective values I2$a$, I2$b$ and I2$c$ of subtraction currents Ia*, Ib* and Ic*. When there is no fault and no current changes are detected, subtraction currents Ia*, Ib* and Ic* are calculated based on the instantaneous values in the current cycle and the instantaneous values in the cycle earlier by n cycles than the current cycle. When there is no fault, the phase currents are load currents, and thus, effective values I2$a$, I2$b$ and I2$c$ are zero. Therefore, restricted earth fault relay 40A does not operate.

When a fault occurs and current changes are detected, subtraction currents Ia*, Ib* and Ic* are calculated based on the instantaneous values in the current cycle and the instantaneous values in the reference cycle. In this case, the subtraction currents are currents in which the influence of the load current is removed from the fault current. Therefore, similarly to the configuration in FIG. 3, even when the neutral point current is small, restricted earth fault relay 40A can detect the internal fault with high sensitivity.

Even when a fault occurs and current changes are detected, the effective values of subtraction currents Ia*, Ib* and Ic* become zero after the n cycles elapse since the occurrence of the fault, in the configuration in which subtraction currents Ia*, Ib* and Ic* are calculated based on the instantaneous value in the current cycle and the instantaneous values in the cycle earlier by n cycles than the current cycle. Therefore, when the fault still exists after the n cycles elapse, restricted earth fault relay 40A cannot operate appropriately. For example, when CT saturation occurs at the time of an external fault, the sufficient suppression amount cannot be ensured and restricted earth fault relay 40A may malfunction.

Therefore, in the modification of the present embodiment, even when the fault continues, the phase currents that are not affected by the load current and include only the fault current are calculated. Specifically, subtraction currents Ia*, Ib* and Ic* are calculated based on the instantaneous values of the phase currents in the current cycle and the instantaneous values of the phase currents in the reference cycle earlier by m cycles than the time point of detection of the current changes. As a result, the data in the reference cycle is repeatedly used even after the n cycles elapse since the occurrence of the fault, and thus, the phase currents (i.e., subtraction currents) that are not affected by the load current are obtained. Therefore, restricted earth fault relay 40A can appropriately operate when the fault occurs.

(Operation Example At the Time of Internal Fault)

Figure 10:
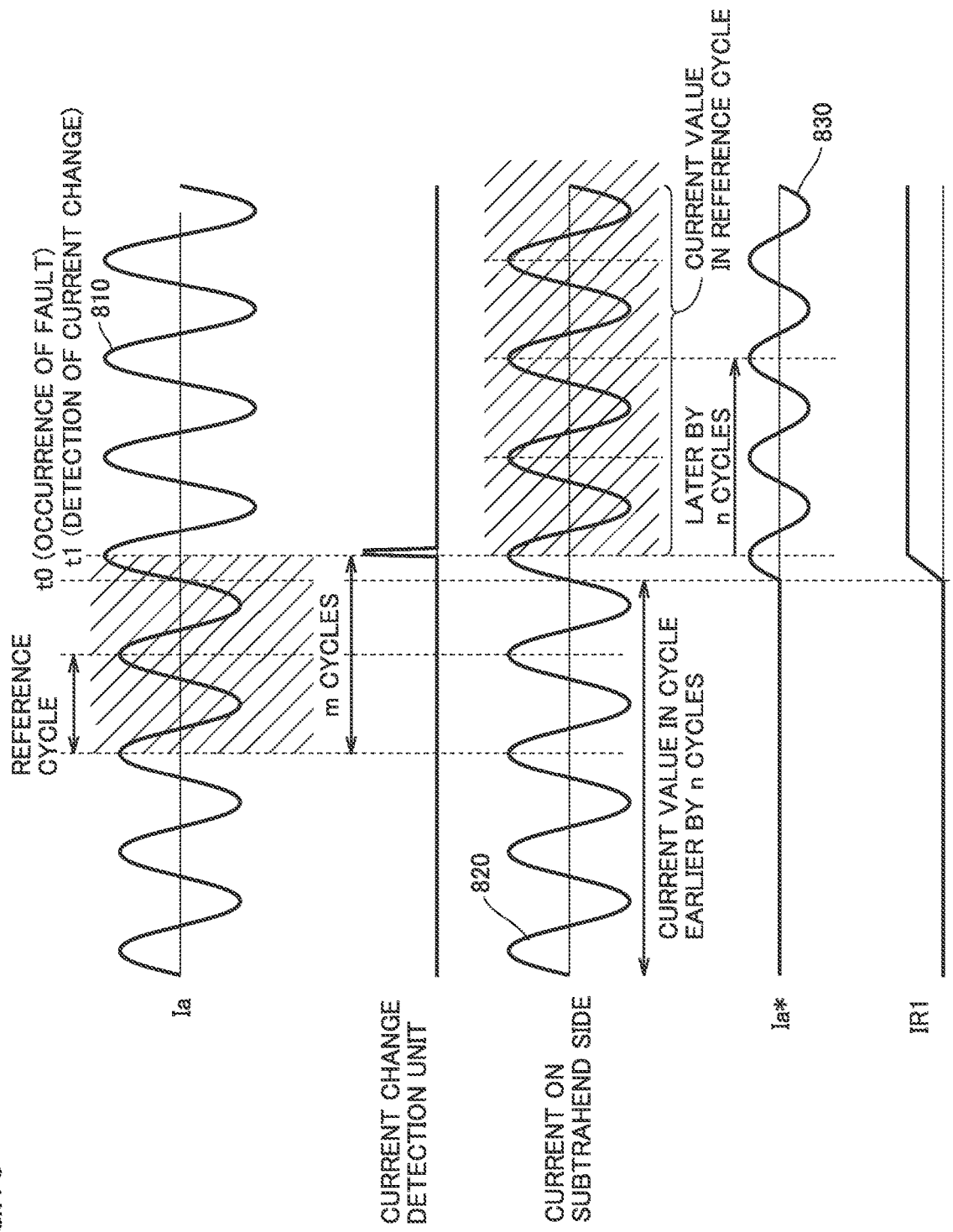
FIG. 10 is a timing chart for illustrating an operation at the time of an internal ground fault in the restricted earth fault relay according to the modification of the first embodiment.

FIG. 10 is a timing chart for illustrating an operation at the time of an internal ground fault in the restricted earth fault relay according to the modification of the first embodiment. In FIG. 10, it is assumed that the neutral point current is small when an internal ground fault occurs in the a phase. In addition, it is assumed that n=2 and m=2.

Referring to FIG. 10, a waveform 810 is a waveform indicating a-phase current Ia, a waveform 820 is a waveform indicating the a-phase current on the subtrahend side used in subtraction unit 15A, and a waveform 830 is a waveform indicating subtraction current Ia*. As shown by waveform 810, when an internal fault occurs at time t0, a-phase current Ia becomes larger.

At time t1, current change detection unit 230A detects the change in the phase current and outputs the value "1". As shown by waveform 820, before the change in the phase current is detected, the current value on the subtrahend side is a current value in a cycle earlier by n cycles. However, when the change in the phase current is detected (i.e., when the value "1" is output), the current value on the subtrahend side becomes a current value in the reference cycle. Therefore, as shown by waveform 830, before the change in the phase current is detected, a-phase current Ia includes only the load current, and thus, subtraction current Ia* is zero. However, after the change in the phase current is detected, subtraction current Ia* becomes an a-phase fault current in which the load current is removed from a-phase current Ia.

Therefore, after the changes in the phase currents are detected, suppression amount IR1 is maintained at the value calculated by using effective values I2$a$ to I2$c$ from which the load current is removed. Based on the foregoing, it is understood that in the modification of the first embodiment as well, the current changes can be instantaneously detected at the time of the occurrence of the fault and suppression amount IR1 can be ensured by using effective values I2$a$ to I2$c$ from which the load current is removed, and thus, the internal fault can be detected with high sensitivity. Similarly, even when CT saturation occurs at the time of an external fault, sufficient suppression amount IR1 is obtained, and thus, malfunction of the restricted earth fault relay can be prevented.

Second Embodiment

In a second embodiment, a configuration in which a lock function at the time of detection of an external fault is added to restricted earth fault relay 40 according to the first embodiment will be described.

Figure 11:
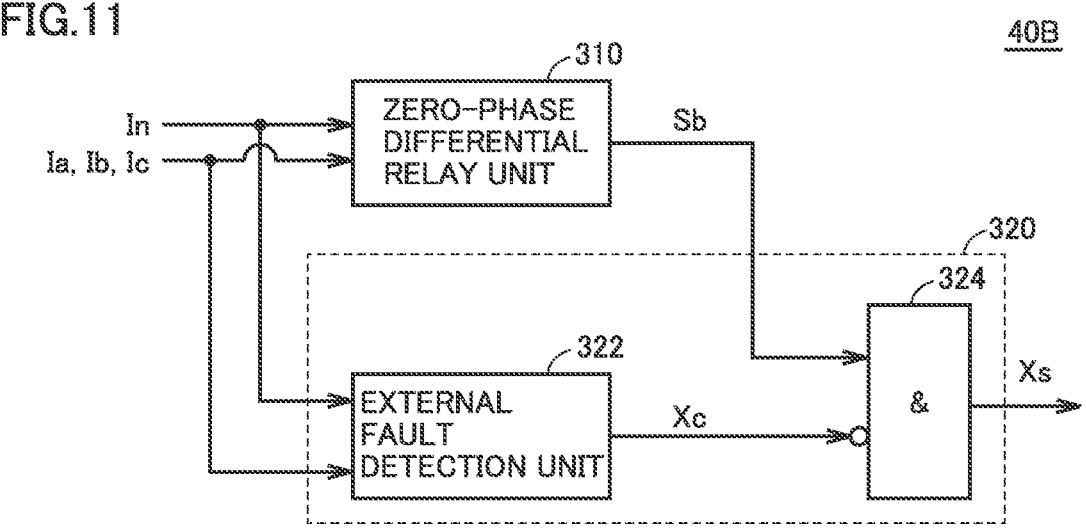
FIG. 11 is a block diagram showing a restricted earth fault relay according to a second embodiment.

FIG. 11 is a block diagram showing a restricted earth fault relay 40B according to the second embodiment. Referring to FIG. 11, restricted earth fault relay 40B includes a zero-phase differential relay unit 310 and an output control unit 320. Zero-phase differential relay unit 310 corresponds to restricted earth fault relay 40 or 40A described in the first embodiment. However, signal Sb output from zero-phase differential relay unit 310 is output to output control unit 320, not to the circuit breaker. Restricted earth fault relay 40B according to the second embodiment corresponds to a configuration in which output control unit 320 is added to restricted earth fault relay 40 or 40A.

As described with reference to FIG. 3 or 9, zero-phase differential relay unit 310 outputs signal Sb. Specifically, when signal Sb has the value "1", this indicates that zero-phase differential relay unit 310 operates and the protection signal for three-phase transformer 30 is output. When signal Sb has the value "0", this indicates that zero-phase differential relay unit 310 does not operate.

Output control unit 320 includes an external fault detection unit 322 and an AND gate 324. External fault detection unit 322 detects an external fault and outputs a signal Xc in accordance with a result of detection. Specifically, external fault detection unit 322 outputs signal Xc having the value "1" when external fault detection unit 322 detects an external fault, and outputs signal Xc having the value "0" when external fault detection unit 322 does not detect an external fault. A specific configuration of external fault detection unit 322 will be described below.

AND gate 324 performs an AND operation on an output value of zero-phase differential relay unit 310 and a value obtained by inverting a logic level of an output of external fault detection unit 322, and outputs a signal Xs. Typically, in response to the output of signal Xs having the value "1", the protection signal (e.g., trip signal) is output to the circuit breaker. As a result, the circuit breaker is opened and three-phase transformer 30 is separated from the power system.

For example, when zero-phase differential relay unit 310 is operating (i.e., signal Sb has the value "1") and when signal Xc has the value "0", AND gate 324 outputs signal Xs having the value "1". That is, when zero-phase differential relay unit 310 is operating and when an external fault is not detected by external fault detection unit 322, the protection signal from zero-phase differential relay unit 310 is output as it is.

AND gate 324 otherwise outputs signal Xs having the value "0". Therefore, when an external fault is detected (i.e., when signal Xc from external fault detection unit 322 has the value "1") even if zero-phase differential relay unit 310 is operating, the operation output by zero-phase differential relay unit 310 is locked. That is, output control unit 320 has the function of locking the output of the protection signal by zero-phase differential relay unit 310 when an external fault occurs.

Figure 12:
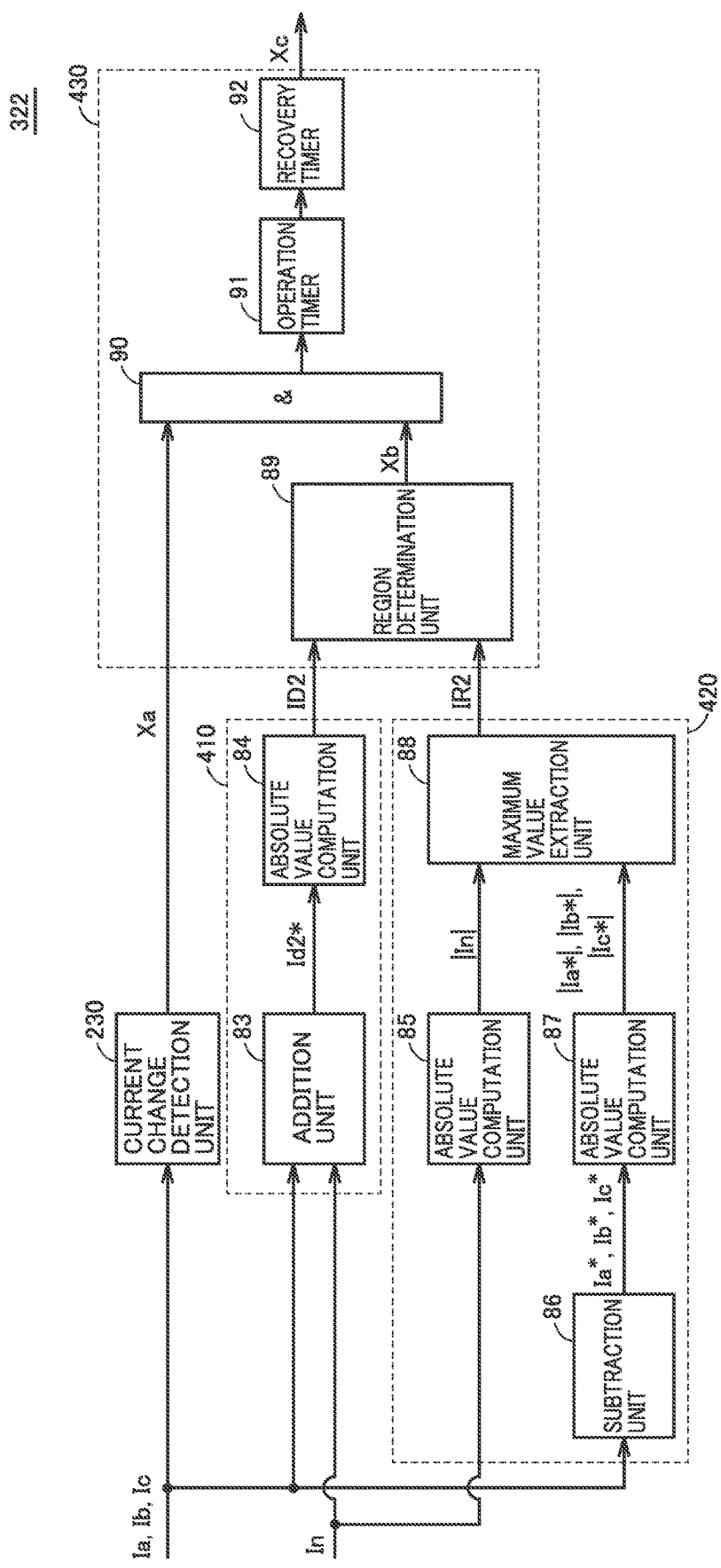
FIG. 12 is a diagram for illustrating a functional configuration of an external fault detection unit according to the second embodiment.

FIG. 12 is a diagram for illustrating a functional configuration of external fault detection unit 322 according to the second embodiment. Referring to FIG. 12, external fault detection unit 322 includes current change detection unit 230, a differential amount calculation unit 410, a suppression amount calculation unit 420, and a signal output unit 430. Current change detection unit 230 in FIG. 12 is the same as current change detection unit 230 in FIG. 4.

Differential amount calculation unit 410 calculates, as a differential amount ID2, an absolute value of an addition current obtained by adding phase currents Ia, Ib and Ic and neutral point current In. Specifically, differential amount calculation unit 410 includes an addition unit 83 and an absolute value computation unit 84. Addition unit 83 outputs, to absolute value computation unit 84, an addition current Id2* (=Ia+Ib+Ic+In) obtained by adding phase currents Ia, Ib and Ic received from current transformers CTa, CTb and CTc and neutral point current In. Absolute value computation unit 84 calculates an absolute value (i.e., |Id2*|) of addition current Id2* as differential amount ID2.

Suppression amount calculation unit 420 calculates, as a suppression amount IR2, a maximum value of absolute values of the subtraction currents in the phases and an absolute value of the neutral point current. Specifically, suppression amount calculation unit 420 includes absolute value computation units 85 and 87, a subtraction unit 86 and a maximum value extraction unit 88. Absolute value computation unit 85 calculates an absolute value |In| of neutral point current In.

Subtraction unit 86 is substantially the same as subtraction unit 15 in FIG. 3. That is, subtraction unit 86 calculates subtraction currents Ia*, Ib* and Ic* obtained by subtracting instantaneous values of phase currents Ia, Ib and Ic in a cycle earlier by n cycles than a current cycle from instantaneous values of phase currents Ia, Ib and Ic in the current cycle. Absolute value computation unit 87 calculates an absolute value |Ia*| of subtraction current Ia*, an absolute value |Ib*| of subtraction current Ib*, and an absolute value |Ic*| of subtraction current Ic*. Maximum value extraction unit 88 calculates a maximum value of absolute values |Ia*|, |Ib*|, |Ic*|, and |In| as suppression amount IR2.

When the changes in the phase currents are detected by current change detection unit 230 and when differential amount ID2 and suppression amount IR2 are not within the operating region (i.e., when differential amount ID2 and suppression amount IR2 are within an external region), signal output unit 430 outputs a lock signal for locking the output of the protection signal. Specifically, signal output unit 430 includes a region determination unit 89, an AND gate 90, an operation timer 91, and a recovery timer 92.

Region determination unit 89 determines whether differential amount ID2 and suppression amount IR2 are outside the operating region, in accordance with the following equations (3) and (4):

$$ID2 < K2 \tag{3}$$

$$ID2 < p2 \times IR2, \tag{4}$$

where K2 represents a settled value indicating the minimum operation sensitivity (hereinafter, referred to as "minimum sensitivity value K2"), and p2 represents a ratio settled to prevent the operation caused by a CT error and the like.

Figure 13:
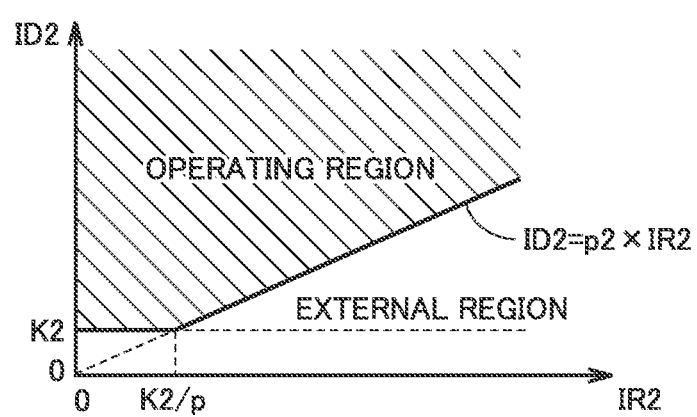
FIG. 13 is an operational characteristic diagram of a region determination unit according to the second embodiment.

FIG. 13 is an operational characteristic diagram of the region determination unit according to the second embodiment. In FIG. 13, the vertical axis represents differential amount ID2, and the horizontal axis represents suppression amount IR2. Referring to FIG. 13, when the point (IR2, ID2) indicating suppression amount IR2 and differential amount ID2 is within the external region, region determination unit 89 outputs signal Xb having the value "1". In contrast, when the point (IR2, ID2) is not within the external region, region determination unit 89 outputs signal Xb having the value "0".

Referring again to FIG. 12, AND gate 90 performs an AND operation on an output value of current change detection unit 230 and an output value of region determination unit 89, and outputs signal Xc. When the current changes are detected by current change detection unit 230 (i.e., when signal Xa has the value "1") and when region determination unit 89 determines that the point (IR2, ID2) is within the external region (i.e., when signal Xb has the value "1"), AND gate 90 outputs signal Xc having the value "1".

When the value "1" of signal Xc from AND gate 90 continues for a time period Top or longer, operation timer 91 outputs the value "1" to recovery timer 92. When operation timer 91 outputs the value "1", recovery timer 92 maintains the value for a time period Tre. Time period Tre is set to be longer than time period Top. Signal Xc having the value "1" that is output from recovery timer 92 corresponds to the lock signal for locking the operation output of zero-phase differential relay unit 310.

Time period Top of operation timer 91 is set such that the operation output of zero-phase differential relay unit 310 can be locked until CT saturation occurs at the time of an external fault. When CT saturation progresses excessively, the operation output of zero-phase differential relay unit 310 cannot be locked. Therefore, the time period during which the locking is possible is set at, for example, a time period from the occurrence of the fault to the lapse of ¼ cycles (i.e., electric angle of 90°). In this case, in order to deal with a large current fault that causes CT saturation, it is necessary to set a total of the time period of detection by current change detection unit 230 and time period Top of operation timer 91 to be less than the ¼-cycle time period.

For example, similarly to the case in FIG. 7, the time period of detection by current change detection unit 230 when CT saturation occurs at the time of an external fault is a time period corresponding to the 1/12 cycles (i.e., electric angle of 30°). In this case, time period Top of operation timer 91 is set at a time period corresponding to 1/12 to 1/6 cycles (i.e., electric angle of 30° to 60°). In the present embodiment, time period Top is set at a time period corresponding to the 1/12 cycles in consideration of a margin. In this case, a total of the time period of detection by current change detection unit 230 and time period Top is a time period corresponding to 2/12 cycles (i.e., less than the ¼ cycles).

Time period Tre of recovery timer 92 is set to be equal to or longer than a time period from the occurrence of an external fault to convergence of CT saturation. Since CT saturation depends on a DC component included in the fault current, time period Tre is set at approximately a time constant (e.g., 5 to 20-cycle time period) of the DC component.

In addition, time period T1 of one shot timer 56 of current change detection unit 230 is set to be longer than operation timer Top in external fault detection unit 322. For example, time period T1 is set at a time period corresponding to one cycle in consideration of a margin.

By configuring external fault detection unit 322 as described above, the output of the protection signal by zero-phase differential relay unit 310 can be instantaneously locked when an external fault occurs. In contrast, when an internal fault occurs, the protection signal is output by zero-phase differential relay unit 310. Therefore, malfunction of zero-phase differential relay unit 310 caused by CT saturation can be prevented with higher accuracy.

In signal output unit 430, subtraction currents Ia*, Ib* and Ic* including only the fault current are used for calculation of suppression amount IR2. Thus, determining that an external fault has occurred despite the occurrence of an internal fault can be prevented. Specifically, in the configuration in which the suppression amount is calculated by using phase currents Ia, Ib and Ic including the load current and the fault current, when the fault current is larger than the load current at the time of the occurrence of an internal fault, the suppression amount is calculated to be larger than the differential amount. In this case, signal output unit 430 may erroneously determine that an external fault has occurred. In contrast, in the configuration in which the suppression amount is calculated by using subtraction currents Ia*, Ib* and Ic* from which the influence of the load current is removed, the differential amount is calculated to be larger than the suppression amount when an internal fault occurs. Therefore, erroneously determining that an external fault has occurred can be prevented.

In addition, differential amount ID2 and suppression amount IR2 used in signal output unit 430 are calculated by absolute value computation, not by effective value computation. When the effective value computation is used, a delay occurs in the calculation time of differential amount ID2 and suppression amount IR2, and thus, it takes time to ensure the sufficient differential amount when an internal fault occurs. As a result, the suppression amount is calculated to be larger than the differential amount, and erroneous determination that an external fault has occurred despite the occurrence of an internal fault may be made. In contrast, when the absolute value computation is used, the sufficient differential amount can be immediately ensured when an internal fault occurs. Therefore, erroneously determining that an external fault has occurred can be prevented.

Figure 14:
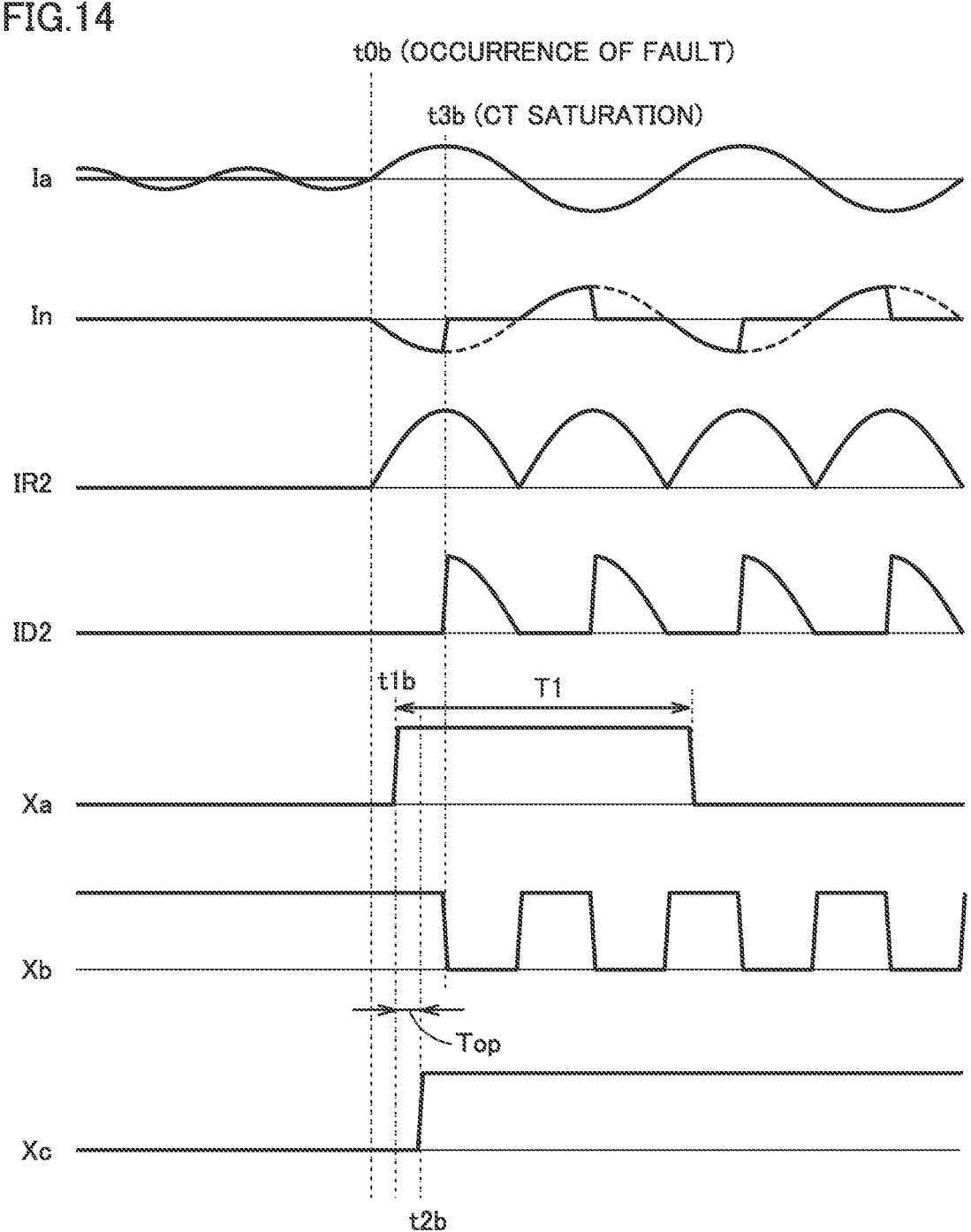
FIG. 14 is a timing chart for illustrating an operation at the time of an external ground fault in the external fault detection unit according to the second embodiment.

FIG. 14 is a timing chart for illustrating an operation at the time of an external fault in the external fault detection unit according to the second embodiment. Similarly to FIG. 7, in FIG. 14, it is assumed that there arises an external fault (e.g., three-phase short-circuit external fault) in which a fault current becomes larger as CT saturation occurs. In addition, it is assumed that current transformer CTN is saturated.

Referring to FIG. 14, when an external fault occurs at time t0b, a-phase current Ia becomes larger and neutral point current In also changes.

At time t1b, current change detection unit 230 detects the change in the phase current and outputs signal Xa having the value "1". A time period from time t0b to time t1b (i.e., time period of detection by current change detection unit 230) is a time period corresponding to, for example, the 1/12 cycles.

Before time t0b, i.e., before the external fault occurs, differential amount ID2 and suppression amount IR2 are within the external region other than the operating region, and thus, region determination unit 89 outputs signal Xb having the value "1". Even when the external fault occurs at time t0b, differential amount ID2 and suppression amount IR2 are within the external region until CT saturation occurs, and thus, region determination unit 89 continues to output signal Xb having the value "1". When CT saturation occurs in current transformer CTN at time t3b, differential amount ID2 and suppression amount IR2 enter the operating region, and thus, region determination unit 89 outputs signal Xb having the value "0". Thereafter, region determination unit 89 outputs signal Xb having the value "0" at the time of CT saturation, and outputs signal Xb having the value "1" at the time of CT non-saturation.

Signal Xc having the value "1" is output at time t2b at which a state in which current change detection unit 230 detects the change in the phase current and region determination unit 89 determines that differential amount ID2 and suppression amount IR2 are within the external region (i.e., state in which signal Xa and signal Xb have the value "1") has continued for time period Top (e.g., time period corresponding to the 1/12 cycles) of operation timer 91. As a result, the operation output of zero-phase differential relay unit 310 is locked.

As shown in FIG. 14, at time t2b earlier than time t3b at which current transformer CTN is saturated, the operation output of zero-phase differential relay unit 310 is locked. Therefore, malfunction of zero-phase differential relay unit 310 caused by CT saturation can be prevented with higher accuracy.

Other Embodiments (1) In the embodiment above, the configuration of current change detection unit 230 in FIG. 5 has been described as detecting the current changes based on addition value ΔI of changes ΔIa, ΔIb and ΔIc. However, the present disclosure is not limited to this configuration. For example, a change ΔIn (=||In|−|In(t−Tα)||) in neutral point current In may be added to addition value ΔI.

(2) In FIG. 3 in the embodiment above, description has been given of the configuration in which the maximum value of effective values I1a to I1c of the phase currents and effective value IN of the neutral point current is calculated as suppression amount IR1 when the changes in the phase currents are not detected, and the maximum value of effective values I2a to I2c of the subtraction currents and effective value IN of the neutral point current is calculated as suppression amount IR1 when the changes in the phase currents are detected. However, the present disclosure is not limited to this configuration. For example, a value obtained by adding effective value IN to a maximum value of effective values I1a to I1c may be calculated as suppression amount IR1 when the changes in the phase currents are not detected, and a value obtained by adding effective value IN to a maximum value of effective values I2a to I2c may be calculated as suppression amount IR1 when the changes in the phase currents are detected.

In summary, when the changes in the phase currents are not detected, suppression amount calculation unit 220 may calculate, as suppression amount IR1, the maximum value of effective values I1a to I1c and IN, or the addition value obtained by adding effective value IN to the maximum value of effective values I1a to I1c. When the changes in the phase currents are detected, suppression amount calculation unit 220 may calculate, as suppression amount IR1, the maximum value of effective values I2a to I2c and IN, or the addition value obtained by adding effective value IN to the maximum value of effective values I2a to I2c.

(3) The configuration of absolute value computation units 84, 85 and 87 in the second embodiment has been described as computing the absolute values by using phase currents Ia, Ib and Ic and neutral point current In at the current time point. However, the present disclosure is not limited to this configuration. For example, absolute value computation unit 84 may calculate, as differential amount ID2, a larger one of absolute value |Id2*| at the current time point and absolute value |Id2*| at a time point earlier by several samples than the current time point. Maximum value extraction unit 88 may calculate, as suppression amount IR2, a larger one of a maximum value of absolute values |Ia*|, |Ib*|, |Ic*|, and |In*| at the current time point and a maximum value of absolute values |Ia*|, |Ib*|, |Ic*|, and |In*| at a time point earlier by several samples than the current time point.

Thus, even when the instantaneous values of the absolute values are zero or near zero with respect to a certain amount of AC input, the instantaneous values of the absolute values have a certain level or more at the time point earlier by several samples than the current time point, and thus, the accuracy of determination by region determination unit 89 can be enhanced. As a result, even when CT saturation occurs at the time of an external fault and this CT saturation is so severe that the unnecessary operation is unavoidable due to a characteristic of a ratio between the differential amount and the suppression amount, the external fault can be determined with higher accuracy.

(4) In the second embodiment above, description has been given of the configuration in which zero-phase differential relay unit 310 corresponds to restricted earth fault relay 40 or 40A in the first embodiment. However, the present disclosure is not limited to this configuration. For example, zero-phase differential relay unit 310 may be a zero-phase differential relay unit that uses a scalar sum method when calculating the suppression amount.

Specifically, the zero-phase differential relay unit includes differential amount calculation unit 210 in FIG. 3, a suppression amount calculation unit that calculates the suppression amount by using the scalar sum method, and operation determination unit 240 in FIG. 3.

Differential amount calculation unit 210 calculates differential amount ID1 based on the zero-phase current and neutral point current In, the zero-phase current being based on phase currents Ia, Ib and Ic. The suppression amount calculation unit calculates, as the suppression amount, a sum (i.e., a scalar sum) of an effective value of the zero-phase current (3×I0) and the effective value of neutral point current In. When differential amount ID1 and the suppression amount are within the operating region, operation determination unit 240 outputs the protection signal for protecting three-phase transformer 30. Description will not be repeated about the functions of region determination unit 21 and operation timer 22 in operation determination unit 240.

In the case of using the scalar sum method, the influence of the load current can be removed. Therefore, when an internal fault in which the fault current is smaller than the load current (i.e., the neutral point current is small) occurs, the suppression amount is maintained small, and thus, the internal fault can be detected with high sensitivity.

However, in the case of using the scalar sum method, the suppression amount is zero when CT saturation occurs at the time of an external fault. In this case, operation determination unit 240 may erroneously determine that an internal fault has occurred despite the occurrence of the external fault, and thus, the zero-phase differential relay unit may malfunction. However, output control unit 320 according to the second embodiment can instantaneously lock the output of the protection signal by the zero-phase differential relay unit when an external fault occurs. Therefore, malfunction of the zero-phase differential relay unit using the scalar sum suppression method, which is caused by CT saturation, can be prevented.

(5) The configurations exemplified as the above-described embodiments are examples of the configuration of the present disclosure, and can be combined with another known technique, or can be modified, for example, partially omitted without departing from the gist of the present disclosure. In addition, in the above-described embodiments, the processing and configurations described in other embodiments may be appropriately adopted and implemented.

It should be understood that the embodiments disclosed herein are illustrative and non-restrictive in every respect. The scope of the present disclosure is defined by the terms of the claims, rather than the description above, and is intended to include any modifications within the scope and meaning equivalent to the terms of the claims.

REFERENCE SIGNS LIST 30 three-phase transformer; 34 neutral point; 35 ground electrode; 36 ground line; 37a, 37b, 37c line; 40, 40A, 40B restricted earth fault relay; 100 input conversion unit; 101 auxiliary transformer; 110 A/D conversion unit; 120 arithmetic processing unit; 130 I/O unit; 210, 410 differential amount calculation unit; 220, 220A, 420 suppression amount calculation unit; 230, 230A current change detection unit; 240 operation determination unit; 250 memory unit; 260 zero current determination unit; 270 setting unit; 310 zero-phase differential relay unit; 320 output control unit; 322 external fault detection unit; 430 signal output unit.

The invention claimed is:

1. A restricted earth fault relay for protecting a three-phase transformer including a Y-connected winding,
   phase currents and a neutral point current of the Y-connected winding being defined to have the same polarity in a direction toward a neutral point,
   the restricted earth fault relay comprising:
   a first differential amount calculation unit that calculates a first differential amount based on a zero-phase current and the neutral point current, the zero-phase current being based on the phase currents;
   a current change detection unit that detects changes in the phase currents;
   a first suppression amount calculation unit that calculates a first suppression amount based on a result of detection by the current change detection unit, the phase currents and the neutral point current,
   the first suppression amount calculation unit
     calculating subtraction currents for the respective phase currents, the subtraction currents being obtained by subtracting the phase currents in a cycle earlier than a current cycle from the phase currents in the current cycle, and
     when the changes in the phase currents are detected, calculating a first maximum value or a first addition value as the first suppression amount, the first maximum value being a maximum value of effective values of the subtraction currents in the phases and an effective value of the neutral point current, the first addition value being a value obtained by adding the effective value of the neutral point current to a maximum value of the effective values of the subtraction currents in the phases; and
   an operation determination unit that outputs a protection signal for protecting the three-phase transformer, when the first differential amount and the first suppression amount are within an operating region.

2. The restricted earth fault relay according to claim 1, wherein
   the first suppression amount calculation unit
     calculates, as the subtraction currents for the respective phase currents, currents obtained by subtracting the phase currents in a cycle earlier by n cycles (n is an integer equal to or larger than 1) than the current cycle from the phase currents in the current cycle, and
     calculates the first maximum value or the first addition value as the first suppression amount until a first time period elapses since the changes in the phase currents are detected, and
   the first time period is shorter than a time period corresponding to the n cycles.

3. The restricted earth fault relay according to claim 2, wherein
   when the first time period elapses since the changes in the phase currents are detected, the first suppression amount calculation unit calculates a second maximum value or a second addition value as the first suppression amount, the second maximum value being a maximum value of effective values of the phase currents and the effective value of the neutral point current, the second addition value being a value obtained by adding the effective value of the neutral point current to a maximum value of the effective values of the phase currents.

4. The restricted earth fault relay according to claim 3, further comprising
   an output control unit that locks output of the protection signal by the operation determination unit, wherein
   the output control unit includes:
     a second differential amount calculation unit that calculates an absolute value of an addition current as a second differential amount, the addition current being obtained by adding the phase currents and the neutral point current;
     a second suppression amount calculation unit that calculates, as a second suppression amount, a maximum value of absolute values of the subtraction currents in the phases and an absolute value of the neutral point current; and
     a signal output unit that outputs a lock signal for locking the output of the protection signal, when the changes in the phase currents are detected and when the second differential amount and the second suppression amount are not within a second operating region.

5. The restricted earth fault relay according to claim 2, further comprising
   an output control unit that locks output of the protection signal by the operation determination unit, wherein
   the output control unit includes:
     a second differential amount calculation unit that calculates an absolute value of an addition current as a second differential amount, the addition current being obtained by adding the phase currents and the neutral point current;
     a second suppression amount calculation unit that calculates, as a second suppression amount, a maximum value of absolute values of the subtraction currents in the phases and an absolute value of the neutral point current; and
     a signal output unit that outputs a lock signal for locking the output of the protection signal, when the changes in the phase currents are detected and when the second differential amount and the second suppression amount are not within a second operating region.

6. The restricted earth fault relay according to claim 1, wherein
when the changes in the phase currents are detected, the first suppression amount calculation unit calculates, as the subtraction currents for the respective phase currents, currents obtained by subtracting the phase currents in a reference cycle from the phase currents in the current cycle, the reference cycle indicating one cycle earlier by m cycles (m is an integer equal to or larger than 1) than a time point of detection of the changes.

7. The restricted earth fault relay according to claim 6, wherein
when a second time period elapses since the changes in the phase currents are detected or when at least one of effective values of the phase currents becomes zero, the first suppression amount calculation unit calculates, as the subtraction currents for the respective phase currents, currents obtained by subtracting the phase currents in a cycle earlier by n cycles (n is an integer equal to or larger than 1, satisfying n≤m) than the current cycle from the phase currents in the current cycle.

8. The restricted earth fault relay according to claim 7, further comprising
an output control unit that locks output of the protection signal by the operation determination unit, wherein
the output control unit includes:
a second differential amount calculation unit that calculates an absolute value of an addition current as a second differential amount, the addition current being obtained by adding the phase currents and the neutral point current;
a second suppression amount calculation unit that calculates, as a second suppression amount, a maximum value of absolute values of the subtraction currents in the phases and an absolute value of the neutral point current; and
a signal output unit that outputs a lock signal for locking the output of the protection signal, when the changes in the phase currents are detected and when the second differential amount and the second suppression amount are not within a second operating region.

9. The restricted earth fault relay according to claim 6, further comprising
an output control unit that locks output of the protection signal by the operation determination unit, wherein
the output control unit includes:
a second differential amount calculation unit that calculates an absolute value of an addition current as a second differential amount, the addition current being obtained by adding the phase currents and the neutral point current;
a second suppression amount calculation unit that calculates, as a second suppression amount, a maximum value of absolute values of the subtraction currents in the phases and an absolute value of the neutral point current; and
a signal output unit that outputs a lock signal for locking the output of the protection signal, when the changes in the phase currents are detected and when the second differential amount and the second suppression amount are not within a second operating region.

10. The restricted earth fault relay according to claim 1, further comprising
an output control unit that locks output of the protection signal by the operation determination unit, wherein
the output control unit includes:
a second differential amount calculation unit that calculates an absolute value of an addition current as a second differential amount, the addition current being obtained by adding the phase currents and the neutral point current;
a second suppression amount calculation unit that calculates, as a second suppression amount, a maximum value of absolute values of the subtraction currents in the phases and an absolute value of the neutral point current; and
a signal output unit that outputs a lock signal for locking the output of the protection signal, when the changes in the phase currents are detected and when the second differential amount and the second suppression amount are not within a second operating region.

11. A restricted earth fault relay for protecting a three-phase transformer including a Y-connected winding,
phase currents and a neutral point current of the Y-connected winding being defined to have the same polarity in a direction toward a neutral point,
the restricted earth fault relay comprising:
a first differential amount calculation unit that calculates a first differential amount based on a zero-phase current and the neutral point current, the zero-phase current being based on the phase currents;
a first suppression amount calculation unit that calculates a first suppression amount based on a scalar sum of the phase currents and the neutral point current;
an operation determination unit that outputs a protection signal for protecting the three-phase transformer, when the first differential amount and the first suppression amount are within an operating region; and
an output control unit that locks output of the protection signal by the operation determination unit,
the output control unit including:
a current change detection unit that detects changes in the phase currents;
a second differential amount calculation unit that calculates an absolute value of an addition current as a second differential amount, the addition current being obtained by adding the phase currents and the neutral point current; and
a second suppression amount calculation unit that calculates a second suppression amount based on the phase currents and the neutral point current,
the second suppression amount calculation unit
calculating subtraction currents for the respective phase currents, the subtraction currents being obtained by subtracting the phase currents in a cycle earlier than a current cycle from the phase currents in the current cycle, and
calculating, as the second suppression amount, a maximum value of absolute values of the subtraction currents in the phases and an absolute value of the neutral point current,
the output control unit further including a signal output unit that outputs a lock signal for locking the output of the protection signal, when the changes in the phase currents are detected and when the second differential amount and the second suppression amount are not within a second operating region.

* * * * *